US009057417B2

(12) United States Patent
Kato et al.

(10) Patent No.: US 9,057,417 B2
(45) Date of Patent: Jun. 16, 2015

(54) VIBRATION ISOLATION UNIT

(71) Applicant: TOYO TIRE & RUBBER CO., LTD., Osaka-shi, Osaka (JP)

(72) Inventors: Hironori Kato, Osaka (JP); Toshifumi Sakata, Osaka (JP); Takeshi Okamura, Osaka (JP); Tatsuya Oniwa, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 274 days.

(21) Appl. No.: 13/658,491

(22) Filed: Oct. 23, 2012

(65) Prior Publication Data

US 2013/0112839 A1     May 9, 2013

(30) Foreign Application Priority Data

Nov. 8, 2011  (JP) ................................. 2011-244966

(51) Int. Cl.
*F16M 13/00* (2006.01)
*F16F 13/10* (2006.01)
*B60K 5/12* (2006.01)

(52) U.S. Cl.
CPC ............. *F16F 13/101* (2013.01); *B60K 5/1266* (2013.01)

(58) Field of Classification Search
USPC ............. 248/562, 566, 636, 638; 267/140.11, 267/140.14, 35, 219
See application file for complete search history.

(56) References Cited

U.S. PATENT DOCUMENTS

| 5,718,417 | A | * | 2/1998 | Aoki ........................ 267/140.14 |
| 5,779,231 | A | * | 7/1998 | Okazaki et al. .......... 267/140.14 |
| 6,032,935 | A | * | 3/2000 | Mizutani et al. ......... 267/140.11 |
| 6,082,718 | A | * | 7/2000 | Yamada et al. .......... 267/140.14 |
| 6,158,724 | A | * | 12/2000 | Takashima et al. ...... 267/140.13 |
| 6,698,732 | B2 | * | 3/2004 | Takashima et al. ...... 267/140.13 |
| 7,025,341 | B2 | * | 4/2006 | Ichikawa et al. ......... 267/140.14 |
| 7,140,603 | B2 | * | 11/2006 | Maeno et al. ............. 267/140.13 |
| 7,637,486 | B2 | * | 12/2009 | Goudie ..................... 267/140.13 |
| 8,231,115 | B2 | * | 7/2012 | Goudie et al. ............ 267/140.12 |
| 8,240,644 | B2 | * | 8/2012 | Lemaire et al. .......... 267/140.13 |

(Continued)

FOREIGN PATENT DOCUMENTS

| CN | 1769735 A | 5/2006 |
| JP | 2009-014080 A | 1/2009 |

OTHER PUBLICATIONS

Office Action dated Jun. 30, 2014, issued in corresponding Chinese Patent Application No. 201210407599.1, with English Translation (11 pages).

*Primary Examiner* — Monica Millner
(74) *Attorney, Agent, or Firm* — Westerman, Hattori, Daniels & Adrian, LLP

(57) ABSTRACT

To provide a vibration isolation unit capable of reducing the number of parts, man-hour and material cost, and suppressing the product cost. One side of a stopper rubber member continues to the outer edge of a diaphragm. Accordingly, because they can be vulcanizingly molded simultaneously, the number of parts can be reduced. Also, because the diaphragm is attached to an outer tube member, the stopper rubber member also can be fixed simultaneously, and therefore the man-hour can be reduced. Further, because one side of the stopper rubber member continues to the outer edge of the diaphragm, overlapping of them in an axial view can be avoided, and a rubber material can be used efficiently. Thus, the number of parts, man-hour and material cost can be reduced and the product cost of the overall vibration isolation unit can be suppressed.

6 Claims, 12 Drawing Sheets

(56) References Cited

U.S. PATENT DOCUMENTS

| | | | |
|---|---|---|---|
| 8,517,359 B2* | 8/2013 | Graeve et al. | 267/140.13 |
| 2002/0149144 A1* | 10/2002 | Takashima | 267/140.13 |
| 2002/0195757 A1* | 12/2002 | Kodama et al. | 267/140.11 |
| 2003/0011117 A1* | 1/2003 | Nishi et al. | 267/140.14 |
| 2003/0015831 A1* | 1/2003 | Takeo et al. | 267/140.14 |
| 2004/0070125 A1* | 4/2004 | Nakagaki et al. | 267/140.14 |
| 2004/0089989 A1* | 5/2004 | Tewani et al. | 267/140.13 |
| 2004/0150146 A1* | 8/2004 | Takeo et al. | 267/140.14 |
| 2004/0183240 A1* | 9/2004 | Maeno et al. | 267/140.11 |
| 2004/0188904 A1* | 9/2004 | Ichikawa et al. | 267/140.14 |
| 2005/0017420 A1* | 1/2005 | Nemoto et al. | 267/140.14 |
| 2005/0029720 A1* | 2/2005 | Bodie et al. | 267/140.14 |
| 2005/0200060 A1* | 9/2005 | Hiraoka | 267/140.13 |
| 2005/0225015 A1* | 10/2005 | Sakata | 267/140.13 |
| 2005/0230890 A1* | 10/2005 | Tewani et al. | 267/140.13 |
| 2006/0043656 A1* | 3/2006 | Shimizu | 267/140.11 |
| 2006/0043658 A1* | 3/2006 | Tanaka et al. | 267/140.13 |
| 2006/0091281 A1* | 5/2006 | Miyahara et al. | 248/636 |
| 2006/0151928 A1* | 7/2006 | Tamura | 267/219 |
| 2007/0057421 A1* | 3/2007 | Nanno et al. | 267/140.13 |
| 2007/0222128 A1* | 9/2007 | Ichikawa et al. | 267/140.14 |
| 2008/0018031 A1* | 1/2008 | Goudie | 267/140.11 |
| 2008/0315472 A1* | 12/2008 | Kadowaki et al. | 267/140.11 |
| 2009/0079118 A1* | 3/2009 | Muraoka et al. | 267/140.14 |
| 2009/0166939 A1* | 7/2009 | Goudie et al. | 267/140.12 |
| 2010/0102492 A1* | 4/2010 | Lee | 267/121 |
| 2010/0219571 A1* | 9/2010 | Ueki et al. | 267/140.13 |
| 2013/0146743 A1 | 6/2013 | Okamura | |

* cited by examiner

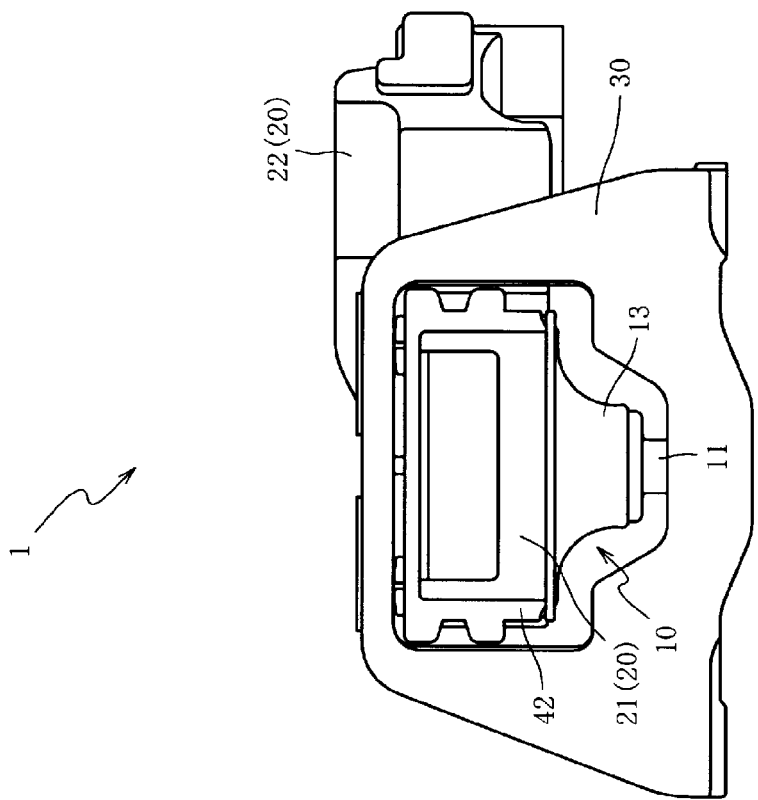
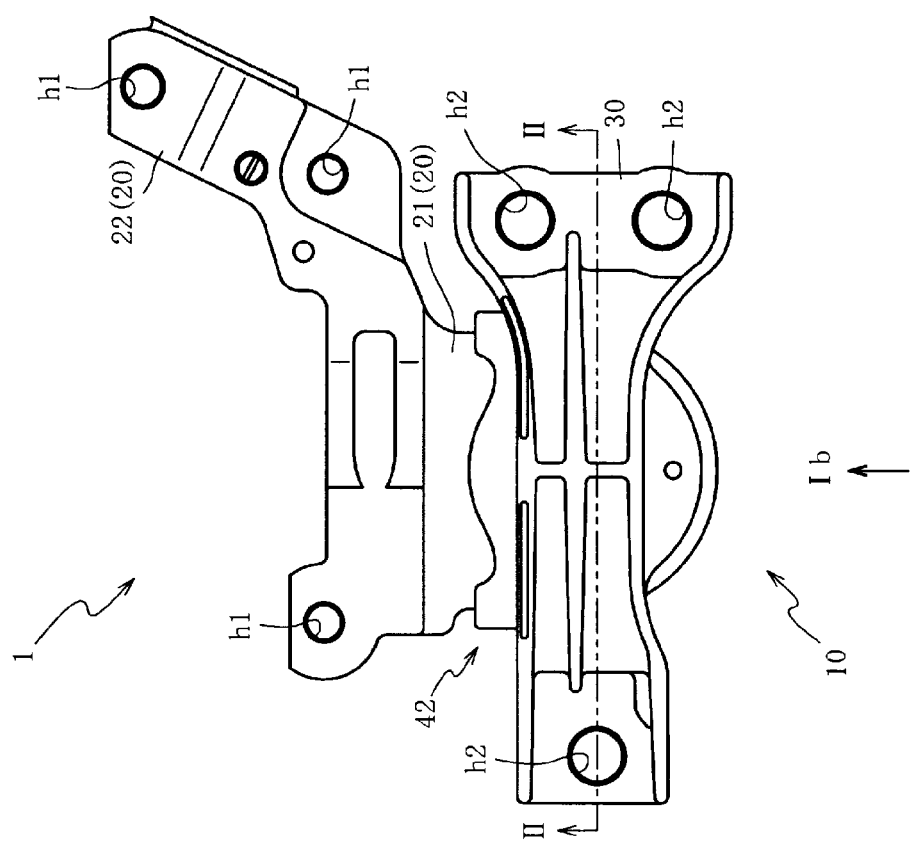
FIG. 1A
FIG. 1B

VIBRATION ISOLATION UNIT

BACKGROUND OF THE INVENTION

1. Field of the Invention

The present invention relates to a vibration isolation unit, and relates specifically to a vibration isolation unit that can reduce the number of parts, man-hour and material cost, and can thereby suppress the product cost.

2. Description of the Related Art

As a vibration isolation unit preventing vibration of an engine for an automobile from being transmitted to a vehicle body while supporting and fixing the engine, one provided with a liquid-sealed vibration isolation device is known. In the vibration isolation unit, the liquid-sealed vibration isolation device is interposed between the engine and the vehicle body through an engine side bracket and a vehicle body side bracket.

For example, in Japanese Unexamined Patent Application Publication No. 2009-14080 (refer to FIG. 1 to FIG. 3, FIG. 14 to FIG. 16, paragraphs 0029, 0036 to 0038, and the like), an inverted type vibration isolation unit is disclosed in which a vibration isolation body 18 (liquid-sealed vibration isolation device) is configured such that a lower attaching tool 12 is attached to the vehicle body side through a frame-like second bracket 22 (vehicle body side bracket) of a rectangular shape in a front view and an upper attaching tool 14 is attached to the engine side through a first bracket 20 (engine side bracket) projecting sideways, in the vibration isolation body 18, the lower attaching tool 12 (boss member) and the upper attaching tool 14 (outer tube tubular part) are connected by a vibration isolation base body 16, and a liquid-sealed chamber 28 is formed between the isolation base body 16 and a diaphragm 30.

In the vibration isolation unit, as a stopper mechanism damping and restricting excessive relative displacement of the upper attaching tool 14 with respect to the lower attaching tool 12, a stopper rubber 84 is furnished in the first bracket 20. The stopper rubber 84 includes a first stopper rubber 86 arranged so as to cover the upper surface of the vibration isolation body 18 and opposing an upper wall 76 of the second bracket 22, and a second stopper rubber 88 extended downward from an edge of the first stopper rubber 86 and interposed between a tubular holding part 46 (pressed-in part) of the first bracket 20 and a vertical wall 74 (side wall) of the second bracket 22.

Also, at the lower end of the second stopper rubber 88, a fixing rubber piece 96 is extended inward in the radial direction, and the stopper rubber 84 is fixed without dropping and dislocation because the fixing rubber piece 96 is held between a flange 26 of the upper attaching tool 14 and a lower end 46c of the tubular holding part 46 of the first bracket 20.

However, the number of parts increases because the conventional vibration isolation unit described above is configured such that the stopper rubber 84 is vulcanizingly molded as a single body and is mounted so as to cover the first bracket 20. Also, in the manufacturing process of the vibration isolation unit, it is required to control to confirm that the fixing rubber piece 96 is properly held between the flange 26 and the tubular holding part 46, and therefore the man-hour increases. Further, rubber material is used inefficiently because a part of the first stopper rubber 86 covering the upper surface of the vibration isolation device body 18 overlaps with a part of the diaphragm 30 in an axial view. Thus, in the conventional vibration isolation unit, there is a problem that the number of parts, man-hour and material cost increase with provision of the stopper rubber, and the product cost increases as much.

SUMMARY OF THE INVENTION

The present invention has been developed in order to address the problem described above, and its object is to provide a vibration isolation unit capable of reducing the number of parts, man-hour and material cost and suppressing the product cost.

According to a first aspect of the present invention, there is provided a vibration isolation unit including: a liquid-sealed vibration isolation device including a cylindrical outer tube member, a boss member positioned on the lower end side of the outer tube member, a vibration isolation base body connecting the boss member and the outer tube member to each other and formed of a rubber-like elastic body, a diaphragm attached on the upper end side of the outer tube member, forming a liquid-sealed chamber between the vibration isolation base body and the diaphragm and formed of a rubber-like elastic body, a partition member partitioning the liquid-sealed chamber into a first liquid chamber on the vibration isolation base body side and a second liquid chamber on the diaphragm side, and an orifice allowing the first liquid chamber and the second liquid chamber to communicate with each other; an engine side bracket including a pressed-in part to which the outer tube member of the liquid-sealed vibration isolation device is pressed-in and which is connected to the engine side; a vehicle body side bracket including a bottom surface to which the boss member of the liquid-sealed vibration isolation device is fixed, a pair of side walls erected from the bottom surface and opposing to each other embracing the liquid-sealed vibration isolation device, and an upper surface connecting the pair of side walls to each other and opposing the bottom surface embracing the liquid-sealed vibration isolation device, and connected to a vehicle body side; and a stopper rubber member interposed between the side wall of the vehicle body side bracket and the pressed-in part of the engine side bracket and formed of a rubber-like elastic body. The stopper rubber member includes stopper rubber upper surfaces of which one side continues to an outer edge of the diaphragm and which are disposed on the upper end side of the pressed-in part of the engine side bracket, and stopper rubber side walls hung down from the other side of the stopper rubber upper surfaces and disposed between the side walls of the vehicle body side bracket and the pressed-in part of the engine side bracket.

According to the vibration isolation unit of the first aspect of the present invention, relative displacement in the axial direction of the outer tube member with respect to the boss member is damped and restricted because the stopper rubber upper surfaces of the stopper rubber member abut on the upper surface of the vehicle body side bracket, and relative displacement in the direction perpendicular to the axis of the outer tube member with respect to the boss member is damped and restricted because the stopper rubber side walls of the stopper rubber member abut on the side walls of the vehicle body side bracket.

In this case, one side of the stopper rubber upper surface of the stopper rubber member continues to an outer edge of the diaphragm, that is, the stopper rubber member and the diaphragm are formed integrally. Thus, the number of parts can be reduced compared with a conventional one in which the stopper rubber member is required to be vulcanizingly molded as a single body separately from the diaphragm because the stopper rubber member and the diaphragm can be vulcanizingly molded simultaneously. Also, because the diaphragm is attached to the outer tube member, the stopper rubber member is also fixed simultaneously. Accordingly, contrary to related art, it is not required to control to confirm that the fixing rubber piece is properly held as in related art, and therefore the man-hour can be reduced as much. Further, overlapping of a part of the stopper rubber member with a part of the diaphragm in an axial view which occurs in the conventional one can be avoided, and rubber material can be used efficiently because the stopper rubber upper surfaces continue to the outer edge of the diaphragm. Thus, according to the vibration isolation unit of the first aspect of the present invention, the number of parts, man-hour and material cost can be reduced, and the product cost of the overall vibration isolation unit can be suppressed.

In the vibration isolation unit according to the first aspect of the present invention, an annular attaching member to which the diaphragm is vulcanizingly adhered and which is formed of a resin material into an annular shape when viewed in the axial direction. The outer tube member is formed of a resin material into a cylindrical shape, and the diaphragm is attached to the upper end side of the outer tube member by that the annular attaching member is welded to the outer tube member by ultrasonic welding. The vibration isolation unit with this structure may be referred to as a second aspect of the present invention.

According to the vibration isolation unit of a second aspect of the present invention, workability can be improved because the outer tube member and the annular attaching member are formed of a resin material and the diaphragm can be attached to the outer tube member by welding the annular attaching member to the outer tube member by ultrasonic welding.

That is, the upper surface of the annular attaching member is covered by a rubber-like elastic body because the stopper rubber upper surfaces of the stopper rubber member continue to the outer edge of the diaphragm. Accordingly, in a structure in which the annular attaching member is pressed-in to the outer tube member for example, a part on which a press-in implement is to be abutted cannot be secured in the upper surface of the annular attaching member, it is required to directly press the rubber-like elastic body covering the upper surface thereof, and therefore the workability is inferior. Also, when the rubber-like elastic body is partly omitted and a part of the upper surface of the annular attaching member is exposed in order to make the press-in implement abut thereupon, a damping action in exerting the stopper function deteriorates and an abnormal sound is generated.

In the vibration isolation unit according to the second aspect of the present invention, the annular attaching member includes an annular part to which the diaphragm is vulcanizingly adhered and a tubular part connected to the lower surface side of the annular part, formed into a cylindrical shape, and internally fitted to the inner peripheral side or externally fitted to the outer peripheral side of the outer tube member, and the outer tube member and the tubular part of the annular attaching member are welded to each other by subjecting the outer peripheral side of the outer tube member to which the tubular part of the annular attaching member is internally fitted on the inner peripheral side or the outer peripheral side of the tubular part of the annular attaching member externally fitted to the outer peripheral side of the outer tube member to ultrasonic welding. The vibration isolation unit with this structure may be referred to as a third aspect of the present invention.

According to the vibration isolation unit of the third aspect of the present invention, by subjecting the outer peripheral side of the outer tube member to which the tubular part of the annular attaching member is internally fitted to the inner peripheral side or the outer peripheral side of the tubular part of the annular attaching member externally fitted to the outer peripheral side of the outer tube member to ultrasonic welding, the outer tube member and the tubular part of the annular attaching member can be welded to each other because the annular attaching member includes a tubular part internally fitted to the inner peripheral side or externally fitted to the outer peripheral side of the outer tube member. That is, ultrasonic welding can be performed while avoiding an adhering boundary surface where the diaphragm and an annular part of the annular attaching member are vulcanizingly adhered with each other. As a result, the adhering boundary surface between the diaphragm and the annular part of the annular attaching member can be suppressed from being peeled off by an ultrasonic wave.

In the vibration isolation unit according to the third aspect, the outer tube member includes a large-diameter tube part positioned on the lower end side and a small-diameter tube part formed to have a diameter smaller than that of the large-diameter tube part and positioned on the upper side, with the large-diameter tube part pressed-in to the pressed-in part of the engine side bracket, and the tubular part of the annular attaching member is internally fitted to the inner peripheral side of the small-diameter tube part of the outer tube member. The vibration isolation unit with this structure may be referred to as a fourth aspect of the present invention.

According to the vibration isolation unit of the fourth aspect of the present invention, the outer tube member includes the large-diameter tube part positioned on the lower end side and the small-diameter tube part formed to have a smaller diameter than that of the large-diameter tube part and positioned on the upper end side, the large-diameter tube part is pressed-in to the pressed-in part of the engine side bracket, the tubular part of the annular attaching member is internally fitted to the inner peripheral side of the small-diameter tube part of the outer tube member, and therefore a space can be formed between the outer peripheral surface of the small-diameter tube part of the outer tube member and the inner peripheral surface of the pressed-in part of the engine side bracket. Thus, in performing ultrasonic welding from the outer peripheral side of the small-diameter tube part of the outer tube member, a working space for a horn can be secured, and therefore workability of ultrasonic welding can be improved.

Also, with this configuration, the upper end surface of the pressed-in part of the engine side bracket does not need to be positioned lower than the upper end surface of the small-diameter tube part of the outer tube member (that is, to be retracted to a direction departing from the upper surface of the vehicle body side bracket), and the upper end surface of the pressed-in part of the engine side bracket can be arranged at a position similar to that of the upper end surface of the small-diameter tube part of the outer tube member (or the upper end surface of the annular attaching member). Thus, in exerting the stopper function, a pressure receiving area of the stopper rubber upper surface of the stopper rubber member can be secured, and durability thereof can be improved. Also, durability of the outer tube member (or the annular attaching member) and the engine side bracket can be improved because a reaction force from the upper surface of the vehicle body side bracket can be shared by both of the upper end surface of the small-diameter tube part of the outer tube member (or the upper end surface of the annular attaching member) and the upper end surface of the pressed-in part of the engine side bracket.

In the vibration isolation unit according to the fourth aspect of the present invention, in the annular attaching member, an outer edge portion of the annular part is formed so as to extend outward in the radial direction from the tubular part, and the lower surface of the outer edge portion of the annular part formed so as to extend outward in the radial direction from the tubular part is made to abut on an upper end surface of the small-diameter tube part of the outer tube member. The vibration isolation unit with this structure may be referred to as a fifth aspect of the present invention.

According to the vibration isolation unit of the fifth aspect of the present invention, the annular attaching member is formed so that the outer edge part of the annular part is extended outward in the radial direction from the tubular part, the lower surface of the outer edge part of the annular part formed so as to extend outward in the radial direction from the tubular part is made to abut on the upper end surface of the small-diameter tube part of the outer tube member, therefore workability in performing ultrasonic welding can be improved, and breakage of the welded part accompanying exertion of the stopper function can be prevented.

That is, in internal fitting (inserting) of the tubular part of the annular attaching member to the inner peripheral side of the small-diameter tube part of the outer tube member, the tubular part can be positioned in the inserting direction because the outer edge part of the annular part formed so as to extend from the tubular part outward in the radial direction is made to abut on the upper end surface of the small-diameter tube part of the outer tube member, and therefore workability can be improved as much.

Also, when relative displacement in the axial direction of the outer tube member with respect to the boss member is restricted by the upper surface of the vehicle body side bracket, the reaction force generated in restricting can be received by the engagement section of the outer edge part of the annular part of the annular attaching member and the upper end surface of the small-diameter tube part of the outer tube member because the outer edge part of the annular part formed so as to extend from the tubular part outward in the radial direction is made to abut on the upper end surface of the small-diameter tube part of the outer tube member thus. Accordingly, a force applied to the weld section of the tubular part of the annular attaching member and the small-diameter tube part of the outer tube member can be reduced as much.

In the vibration isolation unit according to the first aspect of the invention, the liquid-sealed vibration isolation device includes a decompressing-cum-pouring hole allowing the liquid-sealed chamber to communicate with the outside and a sealer sealing the decompressing-cum-pouring hole, and is manufactured by filling the liquid-sealed chamber with liquid by pouring the liquid through the decompressing-cum-pouring hole after decompressing inside of the liquid-sealed chamber through the decompressing-cum-pouring hole, and sealing the decompressing-cum-pouring hole by the sealer, and the decompressing-cum-pouring hole is disposed in the annular attaching member. The vibration isolation unit with this structure may be referred to as a sixth aspect of the invention.

According to the vibration isolation unit of the sixth aspect of the present invention, assembling of the liquid-sealed vibration isolation device (filling the liquid-sealed chamber with liquid) can be performed after the outer tube member is pressed-in to the pressed-in part of the engine side bracket because the liquid-sealed vibration isolation device includes the decompressing-cum-pouring hole that allows the liquid-sealed chamber to communicate with the outside and a sealer that seals the decompressing-cum-pouring hole, and, as a result, assembling equipment can be made compact and the efficiency of the manufacturing process can be improved.

That is, in the vibration isolation unit of the sixth aspect of the present invention, in order to press-in the outer tube member of the liquid-sealed vibration isolation device to the pressed-in part of the engine side bracket after assembling the liquid-sealed vibration isolation device in the liquid, it is required to fold the stopper rubber member so as not to be obstructive in pressing-in, and the man-hour increases because the diaphragm and the stopper rubber member are formed integrally. On the other hand, when the outer tube member is pressed-in to the pressed-in part of the engine side bracket beforehand and the partition member, diaphragm and the like are thereafter assembled to them in the liquid, it is required to sink the engine side bracket also into the liquid, and the storage tank storing the liquid becomes large. To the contrary, according to the vibration isolation unit of the sixth aspect of the present invention, after the outer tube member is pressed-in to the pressed-in part of the engine side bracket, the partition member, diaphragm and the like are assembled in the atmosphere and the liquid-sealed chamber can be filled with the liquid by vacuum suction, therefore the process for folding the stopper rubber member is not required, and the efficiency of the manufacturing process can be improved. Also, the storage tank is not required and the assembling equipment can be made compact because there is no work in the liquid.

BRIEF DESCRIPTION OF THE DRAWINGS

FIG. 1A is a top view of the vibration isolation unit of a first embodiment of the present invention, and FIG. 1B is a front view of the vibration isolation unit when viewed from the direction of the arrow Ib of FIG. 1A.

DESCRIPTION OF THE PREFERRED EMBODIMENTS

Hereinafter, the preferred examples of the present invention will be described referring to the attached drawings.

First, the overall constitution of a vibration isolation unit 1 will be described referring to FIG. 1A, FIG. 1B and FIG. 2.

FIG. 1A is a top view of the vibration isolation unit 1 of a first embodiment of the present invention, and FIG. 1B is a front view of the vibration isolation unit 1 when viewed from the direction of the arrow Ib of FIG. 1A. FIG. 2 is a cross-sectional view of the vibration isolation unit 1 taken from the line II-II of FIG. 1A. Further, FIG. 2 corresponds to a cross section including the axis O. Furthermore, in FIG. 2, a bolt is illustrated not by the cross-sectional view.

Figure 2:
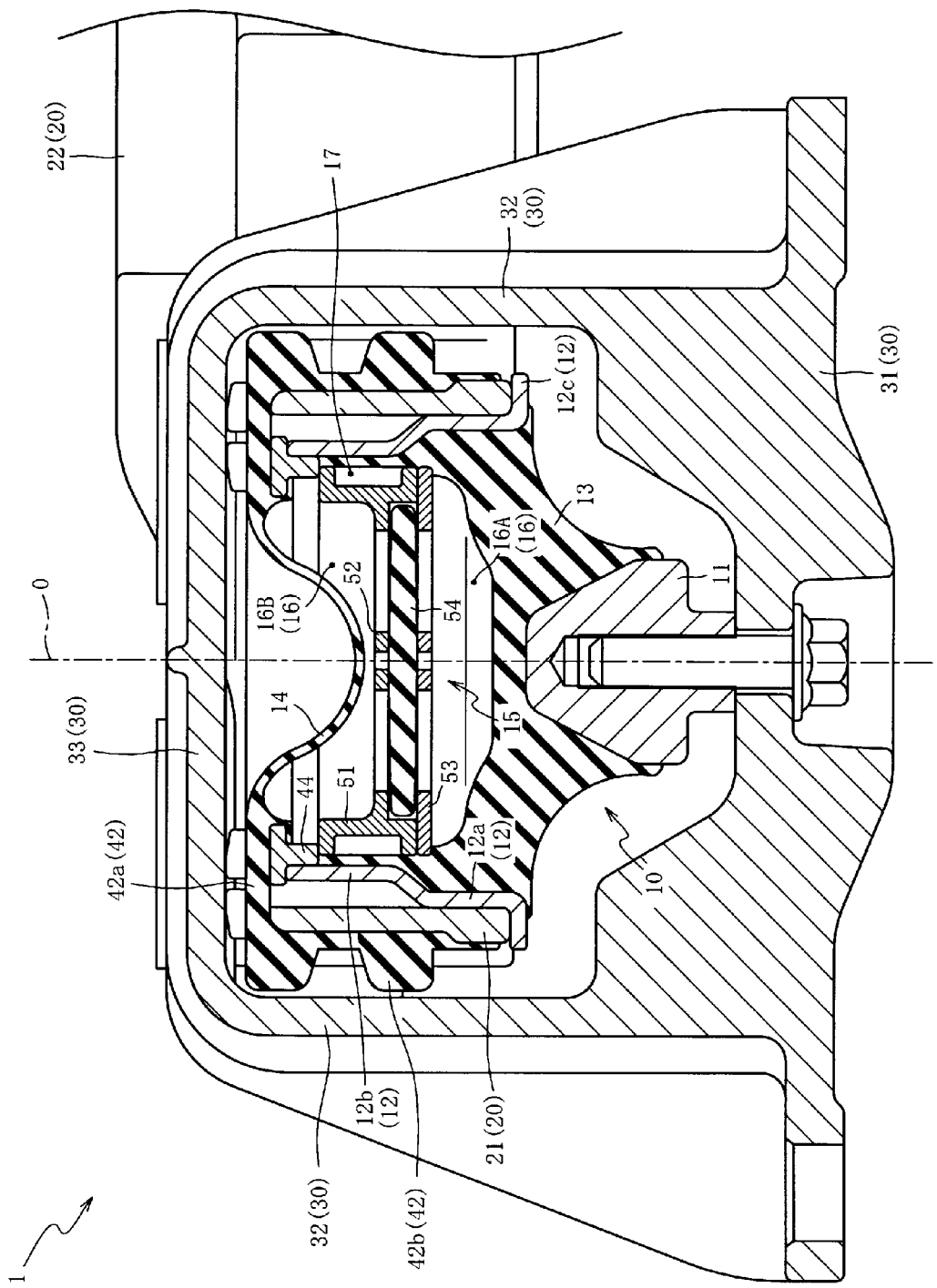
FIG. 2 is a cross-sectional view of the vibration isolation unit taken from the line II-II of FIG. 1A.

As shown in FIG. 1A, FIG. 1B and FIG. 2, the vibration isolation unit 1 is a device for suppressing vibration of an engine (not shown) of an automobile from being transmitted to a vehicle body (not shown) while supporting and fixing the engine, and includes a vibration isolation device 10 in which a boss member 11 and an outer tube member 12 are connected to each other by a vibration isolation base body 13, an engine side bracket 20 holding the outer tube member 12 of the vibration isolation device 10 and attached to the engine side, and a vehicle body side bracket 30 to which the boss member 11 of the vibration isolation device 10 is fixed and which is attached to the vehicle body side.

The vibration isolation device 10 is arranged at a vertical attitude in which the axis O direction agrees with the vertical direction, is arranged in an inverted state in which the boss member 11 side comes to the downward side, and is surrounded by the vehicle body side bracket 30 that is formed into a frame shape in a front view. The engine side bracket 20 is extended horizontally from a side of the vibration isolation device 10 outward in the radial direction (direction perpendicular to the axis O, upward in FIG. 1A).

In a state that the vibration isolation unit 1 supports and fixes the engine of an automobile to the vehicle body (so-called 1 W state), the vibration isolation base body 13 is compressingly deformed (that is, the outer tube member 12 is displaced so as to approach the boss member 11) by the weight of the engine, and a predetermined gap is formed correspondingly between the upper end side (a diaphragm 14 side) of the vibration isolation device 10 and an upper surface 33 of the vehicle body side bracket 30. In this case, the diaphragm 14 is inflated toward the side opposite to a partition member 15. Also, in FIG. 1A, FIG. 1B and FIG. 2, a state before the engine is supported and fixed (no-load state) is shown.

The vibration isolation device 10 mainly includes the boss member 11 attached to the vehicle body side through the vehicle body side bracket 30, the outer tube member 12 of a cylindrical shape attached to the engine side through the engine side bracket 20, and the vibration isolation base body 13 connecting both the members 11, 12 to each other and formed of a rubber-like elastic body. The boss member 11 is formed of an aluminum alloy to have a cross-sectional shape of a generally truncated cone that narrows as it goes upward, and the lower surface side (lower side in FIG. 2) is fastened and fixed to a bottom surface 31 of the vehicle body side bracket 30 by a bolt.

The outer tube member 12 is formed of a resin material into a cylindrical shape in which upper and lower ends (upper side and lower side in FIG. 2) open, and is disposed above (upper side in FIG. 2) the boss member 11 so as to be coaxial with each other. Also, the outer tube member 12 is constituted so as to have a step, a large-diameter tube part 12a with a large diameter is formed on the lower side (lower side in FIG. 2) of the step and a small-diameter tube part 12b with a small diameter is formed on the upper side (upper side in FIG. 2) of the step. Further, on the lower end side of the large-diameter tube part 12a, a flange-like extended part 12c extending outward in the radial direction is formed. The outer tube member 12 is held in a state that the large-diameter tube part 12a is pressed-in to the pressed-in part 21 of the engine side bracket 20 in the axis O direction and the extended part 12c abuts on the lower end surface of the pressed-in part 21 of the engine side bracket 20.

The vibration isolation base body 13 is formed of a rubber-like elastic body to have a cross-sectional shape of a generally truncated cone that narrows as it goes downward which is symmetric around the axis O, and is vulcanizingly adhered between the outer surface of the boss member 11 and the inner wall surface of the outer tube member 12 (the portions of the large-diameter tube part 12a and the step). A membrane-like rubber membrane continues to an end on the outer tube member 12 side of the vibration isolation base body 13, and the inner wall surface of the small-diameter tube part 12b of the outer tube member 12 is covered by the rubber membrane.

On the upper end side (upper side in FIG. 2) of the outer tube member 12, the diaphragm 14 is furnished in a close contact (watertight) state. Thus, a liquid-sealed chamber 16 into which liquid is sealed is formed between the lower surface side of the diaphragm 14 and the upper surface side of the vibration isolation base body 13. Into the liquid-sealed chamber 16, antifreezing liquid (not shown) such as ethylene glycol and the like is sealed. The partition member 15 is a member partitioning the liquid-sealed chamber 16 into a first liquid chamber 16A on the vibration isolation base body 13 side and a second liquid chamber 16B on the diaphragm side, and on the outer peripheral side thereof, an orifice 17 is formed which is a flow passage allowing the first liquid chamber 16A and the second liquid chamber 16B to communicate with each other.

Also, the liquid-sealed chamber 16 is filled with the liquid by assembling the vibration isolation unit 1 (vibration isolation device 10), thereafter decompressing inside the liquid-sealed chamber 16 by vacuum suction through a decompressing-cum-pouring hole 44c (refer to FIG. 4A and FIG. 4B) to obtain a negative pressure, then pouring the liquid through the decompressing-cum-pouring hole 44c into the liquid-sealed chamber 16 utilizing the negative pressure.

The diaphragm 14 is formed into a membrane shape having a partial sphere shape inflated to the partition member 15 side and symmetric around the axis O, and to the outer peripheral edge thereof, a stopper rubber member 42 continues which covers the upper surface side of the vibration isolation device 10 and the outer peripheral side of a pressed-in part 21 of the engine side bracket 20. That is, the diaphragm 14 and the stopper rubber member 42 are formed integrally of a rubber-like elastic body.

Also, the diaphragm 14 and the stopper rubber member 42 are vulcanizingly adhered to an annular attaching member 44 formed of a resin material into an annular shape when viewed in the axis O direction. The diaphragm 14 and the stopper rubber member 42 are attached to the outer tube member 12 because the annular attaching member 44 is internally fitted on the upper end side of the outer tube member 12 and is connected by ultrasonic welding.

The partition member 15 includes an orifice forming part 51 positioned on the outer peripheral side, a displacement restricting part 52 integrally formed on the inner peripheral surface side of the orifice forming part 51, a displacement restricting part 53 disposed on the lower end side of the orifice forming part 51 and opposing the displacement restricting part 52 at a predetermined interval, and an elastic partition membrane 54 stored between opposing surfaces of the pair of displacement restricting parts 52, 53 in a freely movable manner.

The engine side bracket 20 includes the pressed-in part 21 of a flat plate shape and an extension part 22 of a block shape extended in an oblique direction from a corner on one side (right upper side in FIG. 1A) of the pressed-in part 21, and they are integrally formed of an aluminum alloy. A press-in hole of a circular shape in a top view is bored in the pressed-in part 21, and the vibration isolation device 10 (outer tube member 12) is held by the engine side bracket 20 because the outer tube member 12 is pressed-in to the press-in hole in the axis O direction.

Also, the inside diameter of the press-in hole bored in the pressed-in part 21 is made generally constant along the axis O direction. Accordingly, in a step of welding the outer tube member 12 and the annular attaching member 44 with each other by ultrasonic welding, a space to which a horn that performs ultrasonic welding is inserted can be formed on the outer peripheral side of the weld section (refer to FIG. 8A) while securing strength of the pressed-in part 21 and reducing the manufacturing cost thereof.

The vehicle body side bracket 30 includes the bottom surface 31 to which the boss member 11 of the vibration isolation device 10 is fastened and fixed, a pair of side walls 32 erected from the bottom surface 31 and opposing to each other embracing the vibration isolation device 10, and an upper surface 33 connecting the upper ends of the pair of side walls 32 that have been erected to each other and opposing the bottom surface 31 embracing the vibration isolation device 10, and they are integrally formed of an aluminum alloy. In inputting vibration of large amplitude, relative displacement of a predetermined magnitude or more of the outer tube member 12 with respect to the boss member 11 is restricted because the vehicle body side bracket 30 formed into a frame shape in a front view surrounds the periphery of the vibration isolation device 10.

Also, in the engine side bracket 20, attaching holes h1 are bored at plural positions (three positions in the present embodiment) of the pressed-in part 21 and the extension part 22, and the engine side bracket 20 is fastened and fixed to the engine side by bolts inserted into the respective attaching holes h1. Further, in the vehicle body side bracket 30, attaching holes h2 are bored at plural positions (three positions in the present embodiment) of the bottom surface 31, and the vehicle body side bracket 30 is fastened and fixed to the vehicle body side by bolts inserted into the respective attaching holes h2.

Next, referring to FIG. 3A, FIG. 3B, FIG. 4A and FIG. 4B, detailed constitution of the diaphragm 14 and the stopper rubber member 42 will be described. As described above, according to the present embodiment, the diaphragm 14 and the stopper rubber member 42 are integrally formed.

Figure 3B:
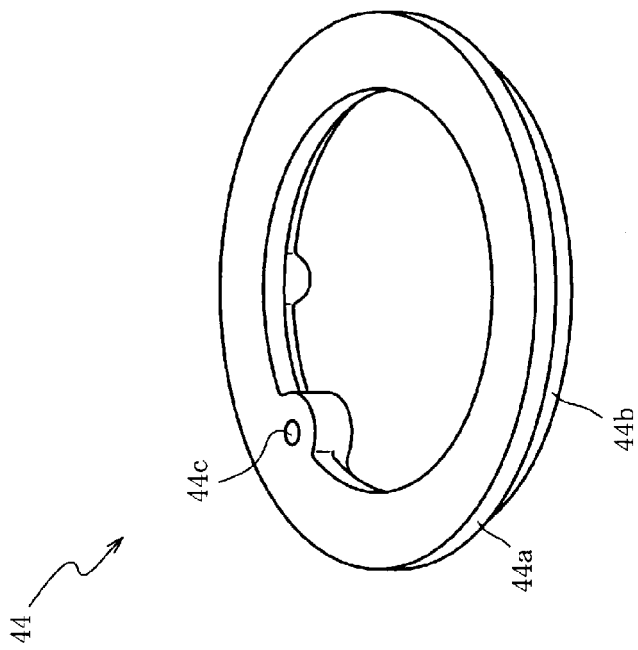
FIG. 3B is a diagonal view of the annular attaching member.
Figure 3A:
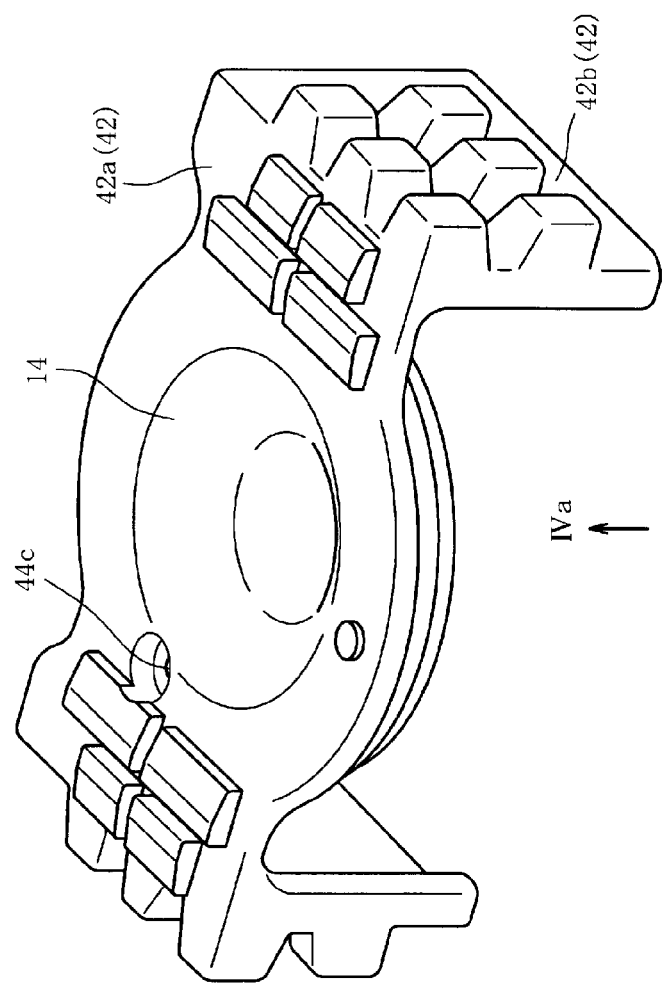
FIG. 3A is a diagonal view of the diaphragm and the stopper rubber member.
Figure 4A:
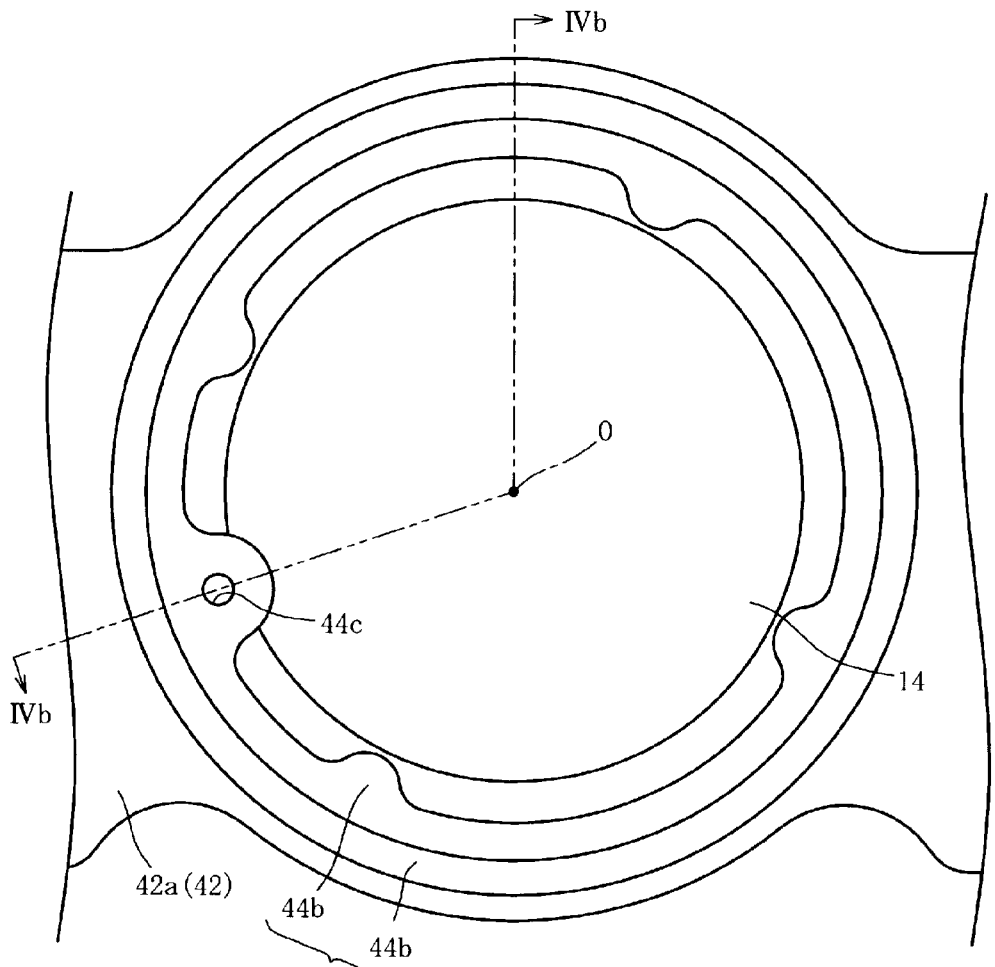
FIG. 4A is a bottom view of the diaphragm and the stopper rubber member when viewed in the arrow IVa direction of FIG. 3A.
Figure 4B:
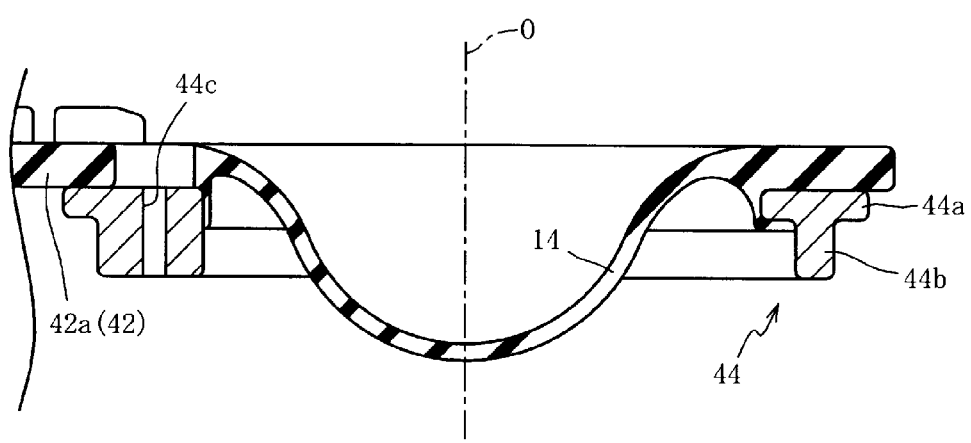
FIG. 4B is a cross-sectional view of the diaphragm and the stopper rubber member taken from the line IVb-IVb of FIG. 4A.

FIG. 3A is a diagonal view of the diaphragm 14 and the stopper rubber member 42, and FIG. 3B is a diagonal view of the annular attaching member 44. Also, FIG. 4A is a bottom view of the diaphragm 14 and the stopper rubber member 42 when viewed in the arrow IVa direction of FIG. 3A, and FIG. 4B is a cross-sectional view of the diaphragm 14 and the stopper rubber member 42 taken from the line IVb-IVb of FIG. 4A. In FIG. 4A and FIG. 4B, illustration of a part of the stopper rubber member 42 is omitted.

As shown in FIG. 3A, FIG. 3B, FIG. 4A and FIG. 4B, the stopper rubber member 42 includes stopper rubber upper surfaces 42a one side of which continues to the outer edge of the diaphragm 14 and which are extended outward in the radial direction, and stopper rubber side walls 42b hung down from the other side of the stopper rubber upper surfaces 42a. Also, with respect to the stopper rubber upper surfaces 42a and the stopper rubber side walls 42b, one pair of each is formed on both sides of the diaphragm 14 embracing the axis 0.

The stopper rubber upper surfaces 42a are portions of a flat plate shape disposed on the upper end side of the outer tube member 12 of the vibration isolation device 10 and on the upper end side of the pressed-in part 21 of the engine side bracket 20, and are made to abut on the bottom surface 31 of the vehicle body side bracket 30 when the outer tube member 12 is displaced toward the axis O relative to the boss member 11. On the upper surface of the stopper rubber upper surfaces 42a, plural projections are projected toward the upper surface 33 of the vehicle body side bracket 30.

The stopper rubber side walls 42b are portions of a flat plate shape disposed between the pressed-in part 21 of the engine side bracket 20 and the side walls 32 of the vehicle body side bracket 30, and is made to abut on the side walls 32 of the vehicle body side bracket 30 when the outer tube member 12 is displaced toward the axis O relative to the boss member 11. On the side surface of the stopper rubber side walls 42b, plural projections are projected toward the side walls 32 of the vehicle body side bracket 30.

As described above, according to the present embodiment, one side of the stopper rubber upper surface 42a of the stopper rubber member 42 continues to the outer edge of the diaphragm 14, and the stopper rubber member 42 and the diaphragm 14 are formed integrally. Thus, because the stopper rubber member 42 and the diaphragm 14 can be vulcanizingly molded simultaneously, the number of parts can be reduced compared to a conventional one in which the stopper rubber member needs to be vulcanizingly molded as a single body separately from the diaphragm.

Figure 8A:
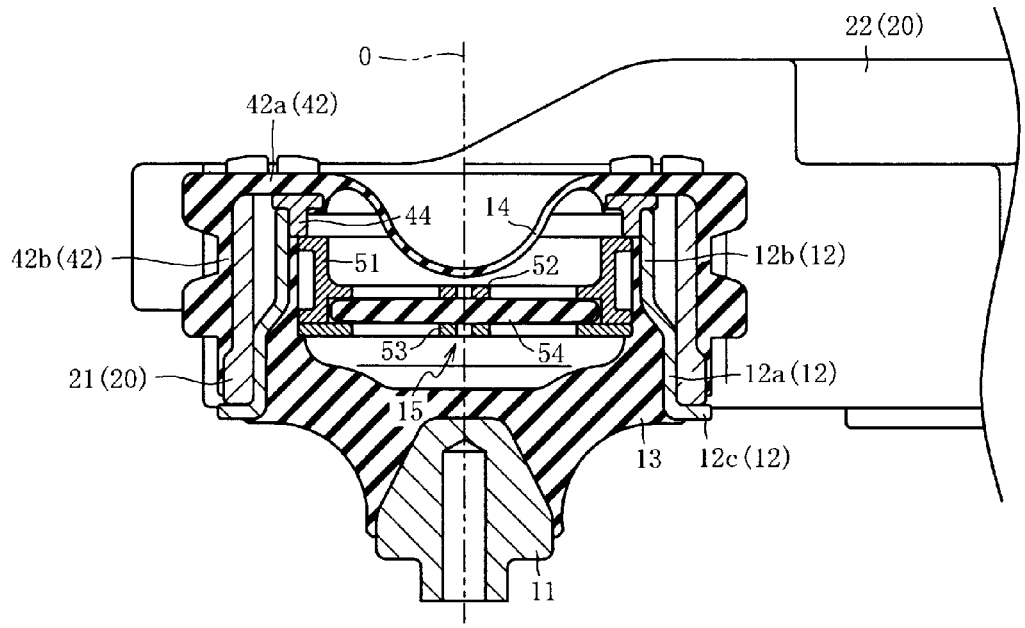
FIG. 8A is a cross-sectional view of a first unit.

Also, the stopper rubber member 42 can be fixed (mounted) simultaneously because the diaphragm 14 is attached to the outer tube member 12 (refer to FIG. 8A). That is, because, contrary to related art, it is not required to control to confirm whether the fixing rubber piece is properly held, the man-hour can be reduced as much.

Further, overlapping of a part of the stopper rubber member with a part of the diaphragm in an axial view which occurs in the conventional one can be avoided because the stopper rubber upper surface 42a continues to the outer edge of the diaphragm 14. That is, the rubber material of the overlapping portion is not wasted, and the rubber material can be used efficiently.

The annular attaching member 44 includes an annular part 44a formed into a flat plate shape of an annular shape in a top view (when viewed in the axis O direction) and a tubular part 44b hung down from the lower surface of the annular part 44a and formed into a tubular shape. The annular part 44a and the tubular part 44b are formed into a shape symmetric around the axis O, the inside diameter of the annular part 44a is made smaller than the inside diameter of the tubular part 44b, the outside diameter of the annular part 44a is made larger than the outside diameter of the tubular part 44b, and thereby the shape of a cross section including the axis O is formed into a T-shape. The annular part 44a is formed to have an outside diameter generally equal to an outside diameter of the small-diameter tube part 12b of the outer tube member 12.

The diaphragm 14 and the stopper rubber member 42 are vulcanizingly adhered to the upper surface, inner peripheral surface and lower surface of the annular part 44a and a part of the inner peripheral surface of the tubular part 44b. Also, the tubular part 44b is internally fitted to the small-diameter tube part 12b of the outer tube member 12 from the upper end side, the tubular part 44b and the small-diameter tube part 12b are welded to each other by ultrasonic welding, and thereby the diaphragm 14 and the stopper rubber member 42 are attached to the outer tube member 12 (refer to FIG. 2).

As described above, the annular attaching member 44 is formed of a resin material along with the outer tube member 12 and the outer tube member 12 and the annular attaching member 44 are connected (joined) to each other by ultrasonic welding, thereby workability in attaching the diaphragm 14 to the outer tube member 12 can be improved, and generation of an abnormal sound can be suppressed.

That is, according to the present embodiment, the upper surface of the annular attaching member 44 is covered by the rubber-like elastic body (diaphragm 14 or the stopper rubber upper surfaces 42a) because the stopper rubber upper surfaces 42a of the stopper rubber member 42 continue to the outer edge of the diaphragm 14.

Accordingly, for example, in a structure in which the annular attaching member 44 is pressed-in and fixed to the small-diameter tube part 12b of the outer tube member 12 (that is, the outside diameter of the tubular part 44b of the annular attaching member 44 is made slightly larger than the inside diameter of the small-diameter tube part 12b of the outer tube member 12, thereby an interference is generated for pressing-in and fixing), a portion (area) on which a press-in tool used when the annular attaching member 44 is pressed-in to the outer tube member 12 abuts cannot be secured on the upper surface of the annular attaching member 44, and it is required to directly press the rubber-like elastic body covering the upper surface thereof. Accordingly, workability is inferior.

On the other hand, when the rubber-like elastic body is partly omitted and a part of the upper surface of the annular attaching member 44 is exposed in order to allow the press-in implement to abut thereupon, the volume of the rubber-like elastic body for exerting the stopper function is reduced as much. Accordingly, the damping action in exerting the stopper function is reduced and an abnormal sound is generated.

In this case, as described below, by subjecting the outer peripheral side of the small-diameter tube part 12b of the outer tube member 12 with the tubular part 44b of the annular attaching member 44 being internally fitted to the inner peripheral side thereof to ultrasonic welding, the small-diameter tube part 12b of the outer tube member 12 and the tubular part 44b of the annular attaching member 44 can be welded to each other because the annular attaching member 44 includes the tubular part 44b of a cylindrical shape hung down from the lower surface of the annular part 44a, (refer to FIG. 8A). That is, ultrasonic welding can be performed while avoiding the adhering boundary surface where the diaphragm 14 and the stopper rubber member 42 are vulcanizingly adhered to the annular attaching member 44. As a result, the adhering boundary surface between the diaphragm 14 and the stopper rubber member 42 and the annular attaching member 44 can be suppressed from being peeled off by an ultrasonic wave.

As shown in FIG. 4A, plural projections (five in the present embodiment) of a semicircle shape when viewed in the axis O direction are projected inward in the radial direction in the annular attaching member 44, and the decompressing-cum-pouring hole 44c is formed in one of the projections. The projection where the decompressing-cum-pouring hole 44c is formed out of the plural projections is formed by that the annular part 44a and the tubular part 44b partly project, and other projections are formed by that only the tubular part 44b partly projects.

The decompressing-cum-pouring hole 44c is a through hole used in decompressing the inside of the liquid-sealed chamber 16 by vacuum suction, and is formed as a through hole penetrating the annular attaching member 44 (the annular part 44a and the tubular part 44b). The inside of the liquid-sealed chamber 16 and the outside are made to communicate with each other by the decompressing-cum-pouring hole 44c (refer to FIG. 8B).

Thus, the annular attaching member 44 is formed into an annular shape when viewed in the axial direction, the diaphragm 14 is vulcanizingly adhered to the inner peripheral edge of the annular attaching member 44, and the decompressing-cum-pouring hole 44c is disposed on the outer side in the radial direction (the left side in FIG. 4B) of the inner peripheral edge of the annular attaching member 44. Accordingly, the outer edge of the diaphragm 14 can be surely vulcanizingly adhered to the inner peripheral edge of the annular attaching member 44 over the entire periphery, and formation of the decompressing-cum-pouring hole 44c in a movable part (a membrane part) of the diaphragm 14 can be avoided. As a result, durability of the diaphragm 14 can be improved.

Also, the decompressing-cum-pouring hole 44c is sealed (is made a non-communicating state, refer to FIG. 8B) by a sealer (for example, a known unit such as a hard ball, rivet and the like) not shown after the inside of the liquid-sealed chamber 16 has been decompressed and filling the liquid-sealed chamber 16 with the liquid has been completed.

Further, an area of the diaphragm 14 and the stopper rubber member 42 (the stopper rubber upper surface 42a) corresponding to the decompressing-cum-pouring hole 44c is recessedly cut off partly in a circular shape in a top view. That is, around an opening on the outer side (the upper side in FIG. 4B) of the decompressing-cum-pouring hole 44c, the diaphragm 14 and the stopper rubber member 42 are not disposed, and the upper surface of a flat plane shape of the annular part 44a of the annular attaching member 44 is exposed.

Thus, because the upper surface of the annular attaching member 44 where the decompressing-cum-pouring hole 44c opens is formed into a flat plane, when a pipe is furnished to the decompressing-cum-pouring hole 44c in a step of decompressing the inside of the liquid-sealed chamber 16 and a step of filling the liquid, the periphery thereof can be surely sealed by utilizing the flat plane of the upper surface of the annular attaching member 44 as a seat surface.

That is, when the decompressing-cum-pouring hole 44c is arranged on the side surface of the outer tube member 12 as done in a conventional one, because the outer surface of the outer tube member 12 is curved in a cylindrical shape, it is difficult to make a seal lip arranged on the pipe side adhere tightly to the outer surface of the outer tube member 12 without a gap due to the dimensional tolerance, the skill of a worker and the like. On the other hand, according to the present embodiment, the seal lip arranged on the pipe side can be adhered tightly without a gap because the surface to be sealed is a flat plane.

Figure 5:
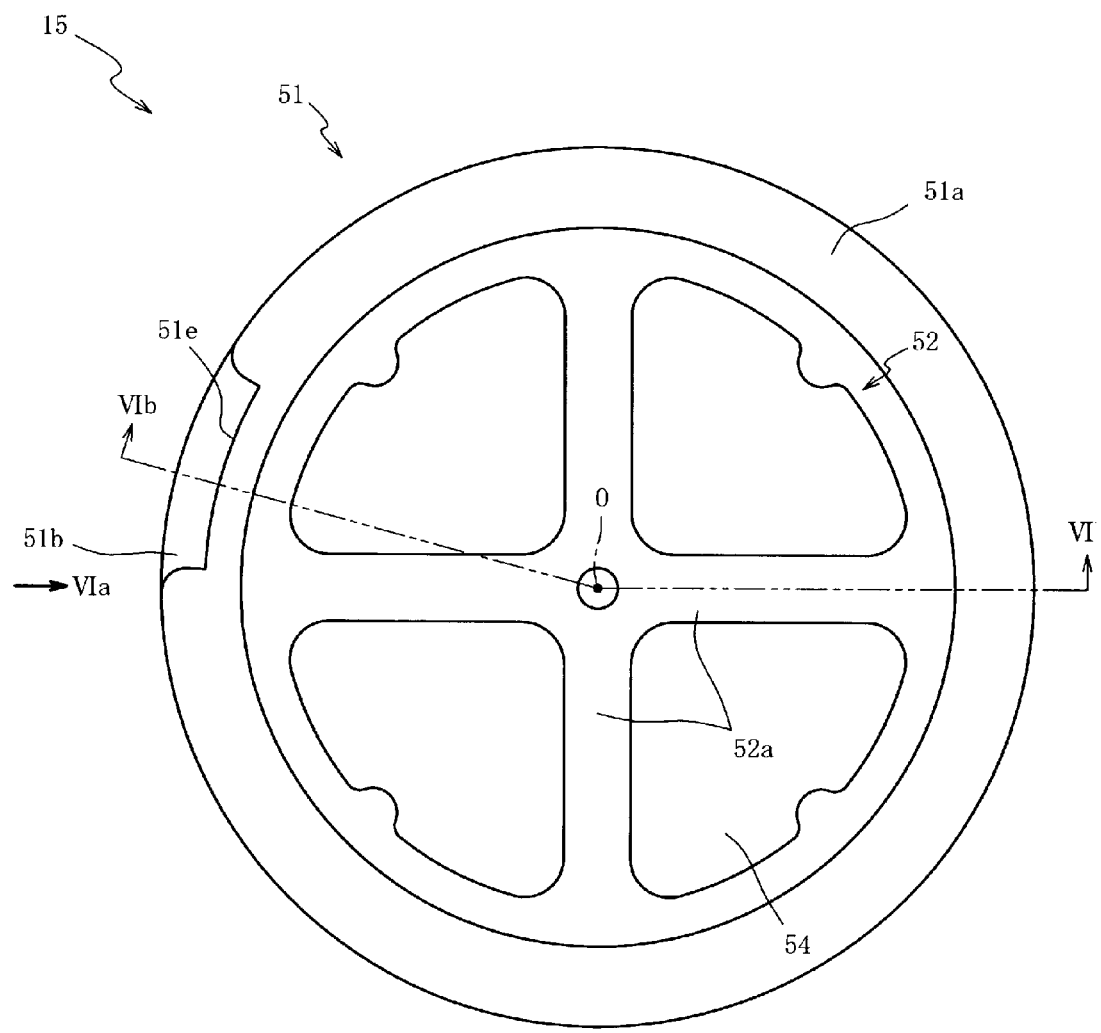
FIG. 5 is a top view of the partition member.
Figure 6A:
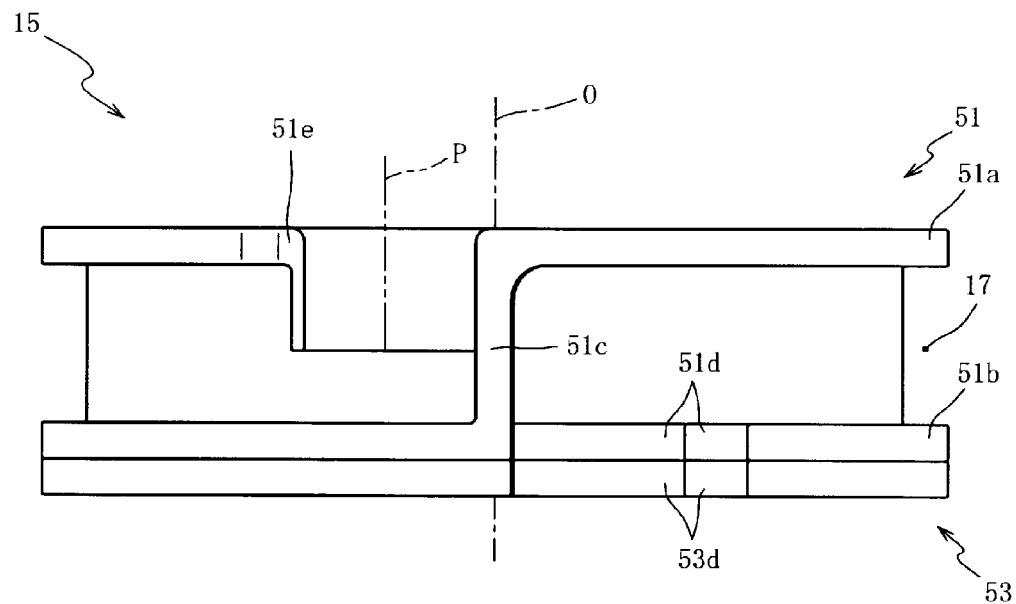
FIG. 6A is a side view of the partition member when viewed in the direction of the arrow VIa of FIG. 5.
Figure 6B:
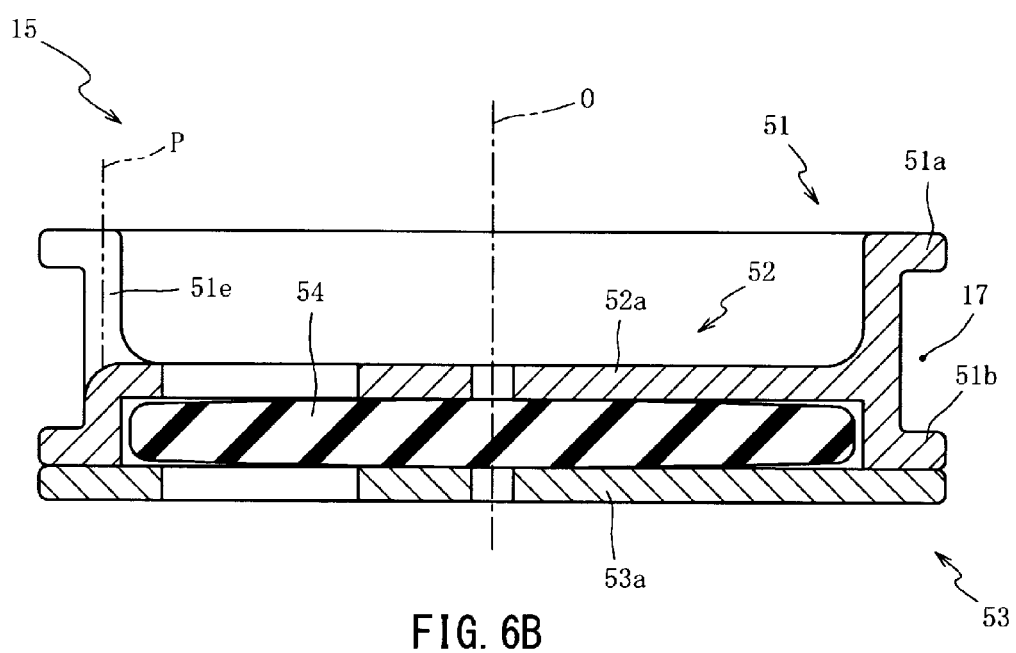
FIG. 6B is a cross-sectional view of the partition member taken from the line VIb-VIb of FIG. 5.

Next, the detailed constitution of the partition member 15 will be described referring to FIG. 5, FIG. 6A and FIG. 6B. FIG. 5 is a top view of the partition member 15. FIG. 6A is a side view of the partition member 15 when viewed in the direction of the arrow VIa of FIG. 5, and FIG. 6B is a cross-sectional view of the partition member 15 taken from the line VIb-VIb of FIG. 5.

In the orifice forming part 51 of the partition member 15, extended walls 51a, 51b of a generally flange shape are formed so as to extend outward in the radial direction. The orifice 17 is formed which is a flow passage allowing a first liquid chamber 16A and a second liquid chamber 16B to communicate with each other because the extended walls 51a, 51b tightly adhere to a rubber membrane covering the inner wall surface of the outer tube member 12 (refer to FIG.

2). Further, as shown in FIG. 6A, the orifice forming part 51 includes a vertical wall 51c connecting the upper and lower extended walls 51a, 51b, and the orifice 17 is divided in the peripheral direction by the vertical wall 51c.

The displacement restricting parts 52, 53 are portions of a plate shape receiving the elastic partition membrane 54 and restricting the displacement thereof, and are formed into a lattice shape where plural openings are formed by plural (four in the present embodiment) ribs 52a, 53a extended radially and linearly from the axis O. That is, the lattice shapes of the displacement restricting parts 52, 53 formed by the ribs 52a, 53a are made same to each other.

The displacement restricting part 52 is formed integrally with the inner peripheral surface of the orifice forming part 51, and is disposed on the side opposing the diaphragm 14. The displacement restricting part 53 is formed into a disk shape having the outside diameter equal to that of the extended walls 51a, 51b of the orifice forming part 51, and is disposed on the side opposing the vibration isolation base body 13. The elastic partition membrane 54 is formed of a rubber-like elastic body into a disk shape, and has a maximum membrane thickness in the center which is made slightly smaller than the gap between the opposing surfaces of the displacement restricting parts 52, 53.

In the extended wall 51b of the orifice forming part 51 and the displacement restricting part 53, cutouts 51d, 53d are openingly formed respectively at a same position in the peripheral direction, and one end of the orifice 17 is made to communicate with the first liquid chamber 16A (refer to FIG. 2) through an opening by both the cutouts 51d, 53d. On the other hand, in the extended wall 51a of the orifice forming part 51, a cutout 51e is openingly formed, and the other end of the orifice 17 is made to communicate with the second liquid chamber 16B (refer to FIG. 2) through an opening by the cutout 51e. The cutout 51e is extended to a same position of the displacement restricting part 52.

Here, the partition member 15 is positioned in the peripheral direction (refer to FIG. 8B) so that the cutout 51e is positioned right below the decompressing-cum-pouring hole 44c of the annular attaching member 44 (to oppose the decompressing-cum-pouring hole 44c) in a state that the vibration isolation device 10 is assembled (refer to FIG. 8A and FIG. 8B).

Also, according to the present embodiment, as shown imaginarily by two-dot chain lines in FIG. 6A and FIG. 6B, in a state that the vibration isolation device 10 is assembled, an imaginary line P which is the extension of the axis of the decompressing-cum-pouring hole 44c of the annular attaching member 44 is positioned generally in the center of the length in the peripheral direction of the cutout 51e (the dimension in the right-left direction in FIG. 6A) and is positioned so as to shift slightly to the axis O side from generally the center of the length in the radial direction (the dimension in the right-left direction in FIG. 6B) of the cutout 51e.

Figure 7A:
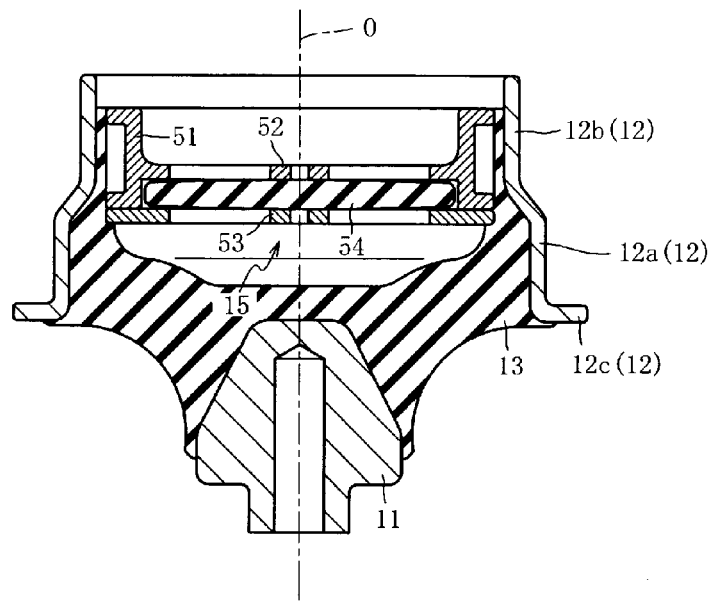
FIG. 7A is a cross-sectional view of a first molded body.
Figure 7B:
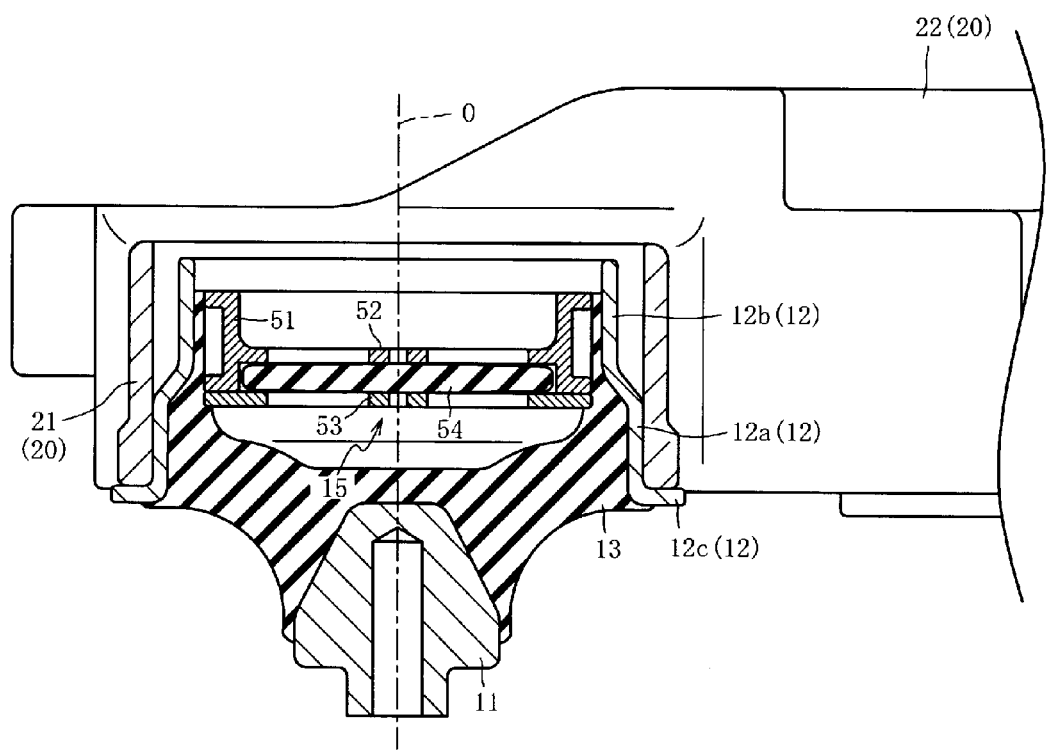
FIG. 7B is a cross-sectional view of the engine side bracket and the first molded body.

Next, a method for manufacturing the vibration isolation unit 1 will be described referring to FIG. 7A, FIG. 7B, FIG. 8A and FIG. 8B. FIG. 7A is a cross-sectional view of a first molded body, and FIG. 7B is a cross-sectional view of the engine side bracket 20 and the first molded body. FIG. 8A is a cross-sectional view of a first unit, and FIG. 8B is a partially enlarged cross-sectional view of the first unit.

In manufacturing the vibration isolation unit 1, first, the first molded body obtained by connecting the boss member 11 and the outer tube member 12 by the vibration isolation base body 13, a second molded body obtained by integrally forming the diaphragm 14 and the stopper rubber member 42 and connecting the annular attaching member 44 (refer to FIG. 3A, FIG. 4A and FIG. 4B), and the elastic partition membrane 54 (refer to FIG. 6B) are vulcanizing molded respectively. Also, the partition member 15 is assembled (that is, the elastic partition membrane 54 is stored between the opposing displacement restricting parts 52, 53, and the displacement restricting part 53 is joined to the orifice forming part 51; refer to FIG. 5, FIG. 6A and FIG. 6B).

After the first molded body and the second molded body have been vulcanizingly molded and the partition member 15 has been assembled, as shown in FIG. 7A, the partition member 15 is fitted in to the inside of the outer tube member 12 of the first molded body. After the partition member 15 has been fitted in to the first molded body, the first molded body (the large-diameter tube part 12a of the outer tube member 12) is pressed-in to the pressed-in part 21 of the engine side bracket 20.

Thus, as shown in FIG. 7B, the first molded body is held by the engine side bracket 20. In this case, the relative position in the peripheral direction of the partition member 15 with respect to the engine side bracket 20 is set to a predetermined position (that is, a position where the cutout 51e of the orifice forming part 51 overlaps the decompressing-cum-pouring hole 44c when viewed in the axis O direction, refer to FIG. 9).

Figure 8B:
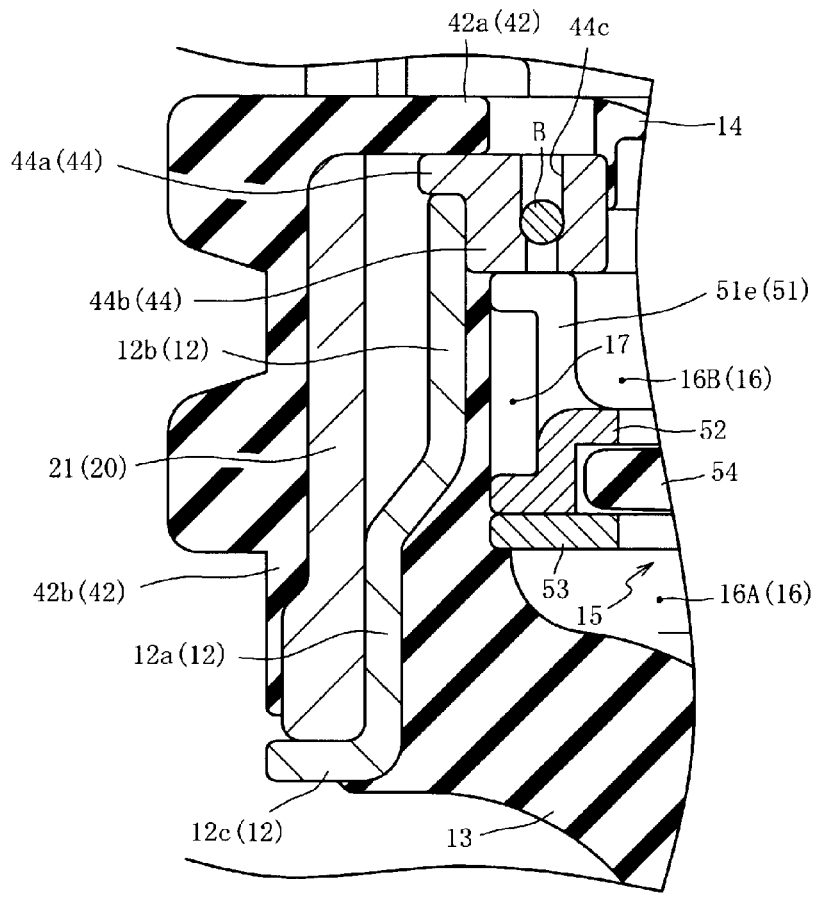
FIG. 8B is a partially enlarged cross-sectional view of the first unit.

According to the present embodiment, the decompressing-cum-pouring hole 44c is formed in the annular attaching member 44 attached on the upper end side of the outer tube member 12 (refer to FIG. 8B). Accordingly, it is possible to prevent the disposal position of the partition member 15 from being limited by the decompressing-cum-pouring hole 44c. That is, when the decompressing-cum-pouring hole 44c is formed on the side surface of the outer tube member 12 as done in a conventional one, it is not possible to dispose the partition member 15 lower than the formation position of the decompressing-cum-pouring hole 44c (on the boss member 11 side), and therefore the vibration isolation device 10 is enlarged toward the axis O direction. On the other hand, according to the present embodiment, the disposal position of the partition member 15 is not limited, and the partition member 15 can be disposed at a position close to the boss member 11 because the decompressing-cum-pouring hole 44c is formed in the annular attaching member 44.

Further, when the decompressing-cum-pouring hole 44c is formed on the side surface of the outer tube member 12 as done in a conventional one, decompressing and liquid filling of the inside of the liquid-sealed chamber 16 cannot be performed after the outer tube member 12 is pressed-in to the engine side bracket 20. On the other hand, even after the outer tube member 12 is pressed-in to the engine side bracket 20, decompression and liquid filling of the inside of the liquid-sealed chamber 16 can be performed because the decompressing-cum-pouring hole 44c is formed in the annular attaching member 44 (refer to FIG. 7B and FIG. 8A).

After the engine side bracket 20 is made to hold the first molded body, the second molded body is attached on the upper end side of the first molded body (that is, the tubular part 44b of the annular attaching member 44 in the second molded body is internally fitted to the small-diameter tube part 12b of the outer tube member 12 in the first molded body), and the small-diameter tube part 12b and the tubular part 44b are welded to each other by ultrasonic welding. Thus, as shown in FIG. 8A, the liquid-sealed chamber 16 (refer to FIG. 2) is formed between the vibration isolation base body 13 and the diaphragm 14.

In a step of performing ultrasonic welding, in inserting the tubular part 44b of the annular attaching member 44 to the inner peripheral side of the small-diameter tube part 12b of the outer tube member 12, the outer edge portion of the annular part 44a formed so as to extend outward in the radial direction from the tubular part 44b can be made to abut on the upper end surface of the small-diameter tube part 12b of the outer tube member 12 because the annular attaching member 44 is formed to have a T-shape cross section (refer to FIG. 4B). Thus, as shown in FIG. 8A, the tubular part 44b can be positioned in the inserting direction (the axis O direction), and workability can be improved as much.

In a state that the annular attaching member 44 is inserted to the outer tube member 12, a space is formed between the outer peripheral surface of the small-diameter tube part 12b of the outer tube member 12 and the inner peripheral surface of the pressed-in part 21 (press-in hole) of the engine side bracket 20 as shown in FIG. 8A. Accordingly, utilizing this space, the horn can be moved, and therefore the workability can be improved. In the step of performing ultrasonic welding, by folding back the stopper rubber member 42 upward, the space can be exposed continuously in the peripheral direction.

Also, when a space can be formed thus between the outer peripheral surface of the small-diameter tube part 12b of the outer tube member 12 and the inner peripheral surface of the pressed-in part 21 (press-in hole) of the engine side bracket 20, it is not necessary to position the upper end surface of the pressed-in part 21 of the engine side bracket 20 lower than the upper end surface of the small-diameter tube part 12b of the outer tube member 12, and the upper end surface of the pressed-in part 21 of the engine side bracket 20 can be arranged in a position similar to the upper surface of the annular part 44a of the annular attaching member 44 (that is, a position close to the upper surface 33 of the vehicle body side bracket 30) as shown in FIG. 8A.

Thus, when the outer tube member 12 is relatively displaced in the axis O direction with respect to the boss member 11 and the stopper rubber upper surfaces 42a of the stopper rubber member 42 are made to abut on the upper surface 33 of the vehicle body side bracket 30, the pressure receiving area of the stopper rubber upper surfaces 42a of the stopper rubber member 42 can be secured by utilizing both surfaces of the upper end surface of the pressed-in part 21 of the engine side bracket 20 and the upper surface of the annular part 44a of the annular attaching member 44. As a result, durability of the stopper rubber member 42 can be improved.

In a similar manner, when the stopper function is exerted, the reaction force from the upper surface 33 of the vehicle body side bracket 30 can be shared equally by both the upper end surface of the pressed-in part 21 of the engine side bracket 20 and the upper surface of the annular part 44a of the annular attaching member 44. Accordingly, a reaction force from the upper surface 33 is dispersed to the outer tube member 12, the annular attaching member 44 and the engine side bracket 20, and durability thereof can be improved.

Here, as described above, the annular attaching member 44 is welded to the small-diameter tube part 12b of the outer tube member 12 in a state that the outer edge portion of the annular part 44a formed so as to extend outward in the radial direction from the tubular part 44b is made to abut on the upper end surface of the small-diameter tube part 12b of the outer tube member 12 (that is, in a state that the outer edge portion of the annular part 44a engages with the upper end surface of the small-diameter tube part 12b). Accordingly, when the relative displacement in the axial direction of the outer tube member 12 with respect to the boss member 11 is restricted by the upper surface 33 of the vehicle body side bracket 30, the reaction force in restricting can be received by an engaging portion of the outer edge portion of the annular part 44a of the annular attaching member 44 and the upper end surface of the small-diameter tube part 12b of the outer tube member 12. Accordingly, a force applied to the weld section between the outer peripheral surface of the tubular part 44b of the annular attaching member 44 and the inner peripheral surface of the small-diameter tube part 12b of the outer tube member 12 can be reduced as much. As a result, damage of the weld section can be suppressed.

After the liquid-sealed chamber 16 has been formed, the inside of the liquid-sealed chamber 16 is decompressed until reaching a predetermined negative pressure state by vacuum suction through the decompressing-cum-pouring hole 44c, thereafter the liquid is poured in through the decompressing-cum-pouring hole 44c utilizing the negative pressure, and thereby the liquid-sealed chamber 16 is filled with the liquid.

In this case, in the step of vacuum suction of the inside of the liquid-sealed chamber 16, the air inside the first liquid chamber 16A can be efficiently sucked through the orifice 17 along with sucking of the air inside the second liquid chamber 16B because the decompressing-cum-pouring hole 44c is arranged at a position overlapping with (a position opposing) the cutout 51e of the partition member 15 when viewed in the axis O direction (refer to FIG. 6A and FIG. 6B). Also, in the step of filling the liquid to the inside of the liquid-sealed chamber 16, the liquid can be efficiently delivered into the first liquid chamber 16A through the orifice 17 along with filling of the liquid into the second liquid chamber 16B.

After the liquid-sealed chamber 16 has been filled with the liquid, the decompressing-cum-pouring hole 44c is sealed by a hard ball B (sealer) made of an iron and steel material, a resin material and the like as shown in FIG. 8B. Thus, a first unit shown in FIG. 8B (that is, the vibration isolation device 10 held by the engine side bracket 20) is formed.

After the first unit has been formed, while the vibration isolation base body 13 of the vibration isolation device 10 is compressed in the axis O direction, the vibration isolation device 10 is arranged between the opposing surfaces of the bottom surface 31 and the upper surface 33 of the vehicle body side bracket 30, and the boss member 11 of the vibration isolation device 10 and the bottom surface 31 of the vehicle body side bracket 30 are fastened and fixed to each other by the bolt. Thus, manufacturing of the vibration isolation unit 1 is completed (refer to FIG. 1A, FIG. 1B and FIG. 2).

Next, a vibration isolation unit 201 in a second embodiment will be described referring to FIG. 9 to FIG. 12. Although the case where the diaphragm 14 and the stopper rubber member 42 are integrally formed is described in the first embodiment, a stopper rubber member 242 in the second embodiment is formed as a body separate from a diaphragm 214. Also, a same reference sign is given to a part same to that of the first embodiment, and description thereof is omitted.

Figure 9:
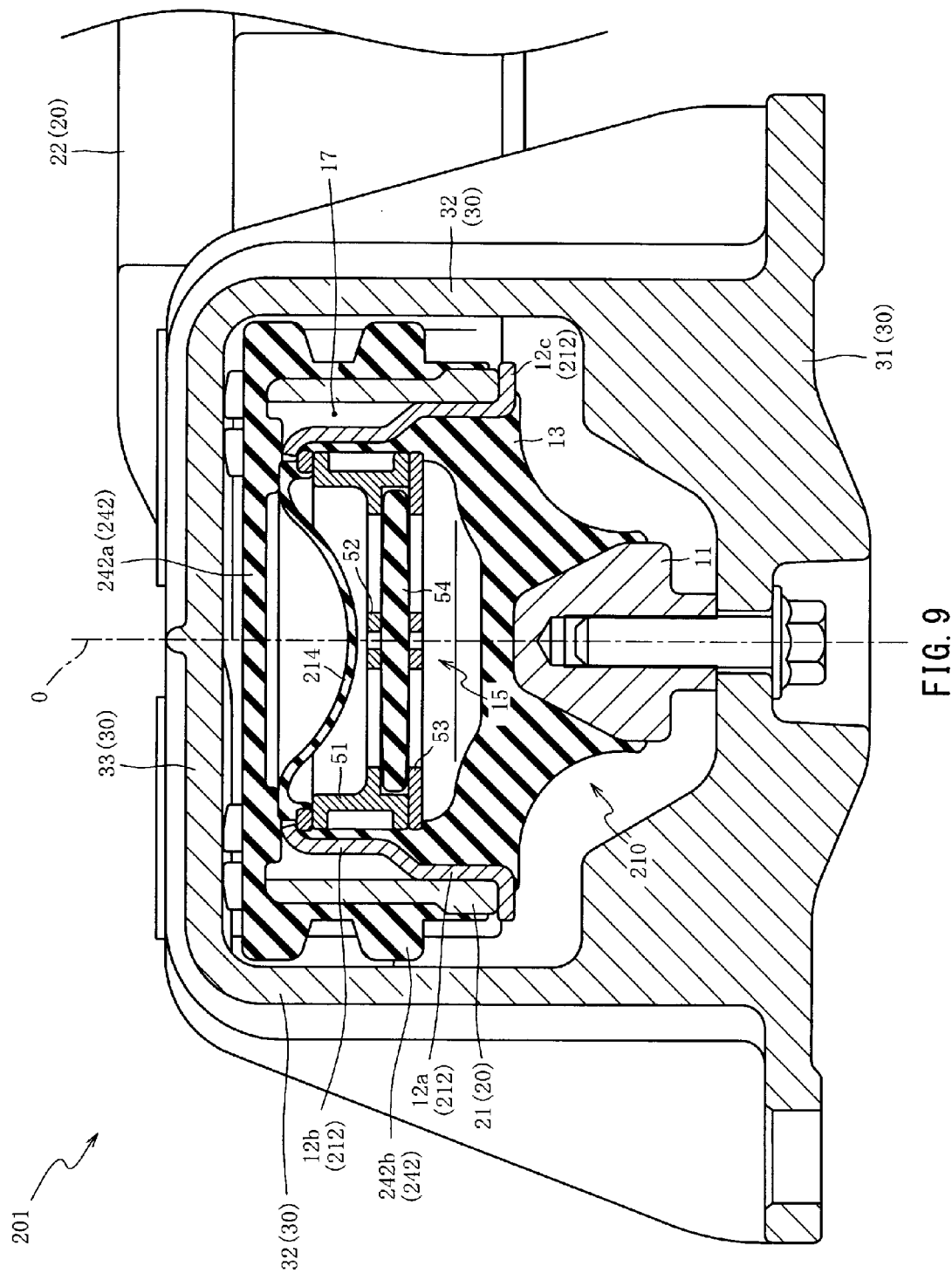
FIG. 9 is a cross-sectional view of the vibration isolation unit in the second embodiment.

FIG. 9 is a cross-sectional view of the vibration isolation unit 201 in the second embodiment. In a vibration isolation device 210 in the second embodiment, the stopper rubber member 242 is formed as a component of a body separate from the diaphragm 214. That is, in the stopper rubber member 242, although stopper side walls 242b are formed similarly to the case of the first embodiment, a stopper upper surface 242a is formed as a portion of one flat plate shape to which a pair of the stopper side walls 242b is connected. The stopper upper surface 242a is placed on the upper surface side (upper side in FIG. 9) of the vibration isolation device 210 and the engine side bracket 20 (the pressed-in part 21).

Also, an outer tube member 212 is formed of an iron and steel material and holds an annular attaching member 244 by subjecting the upper end to diameter reducing work (caulking work). Further, with respect to the outer tube member 212, because the constitutions of respective portions before performing caulking work are similar to the constitutions of the respective portions (the large-diameter tube part 12a, the small-diameter tube part 12b and the extended part 12c) in the first embodiment with the exception that the raw material is different, the same reference signs as them are given, and description thereof is omitted.

Figure 10A:
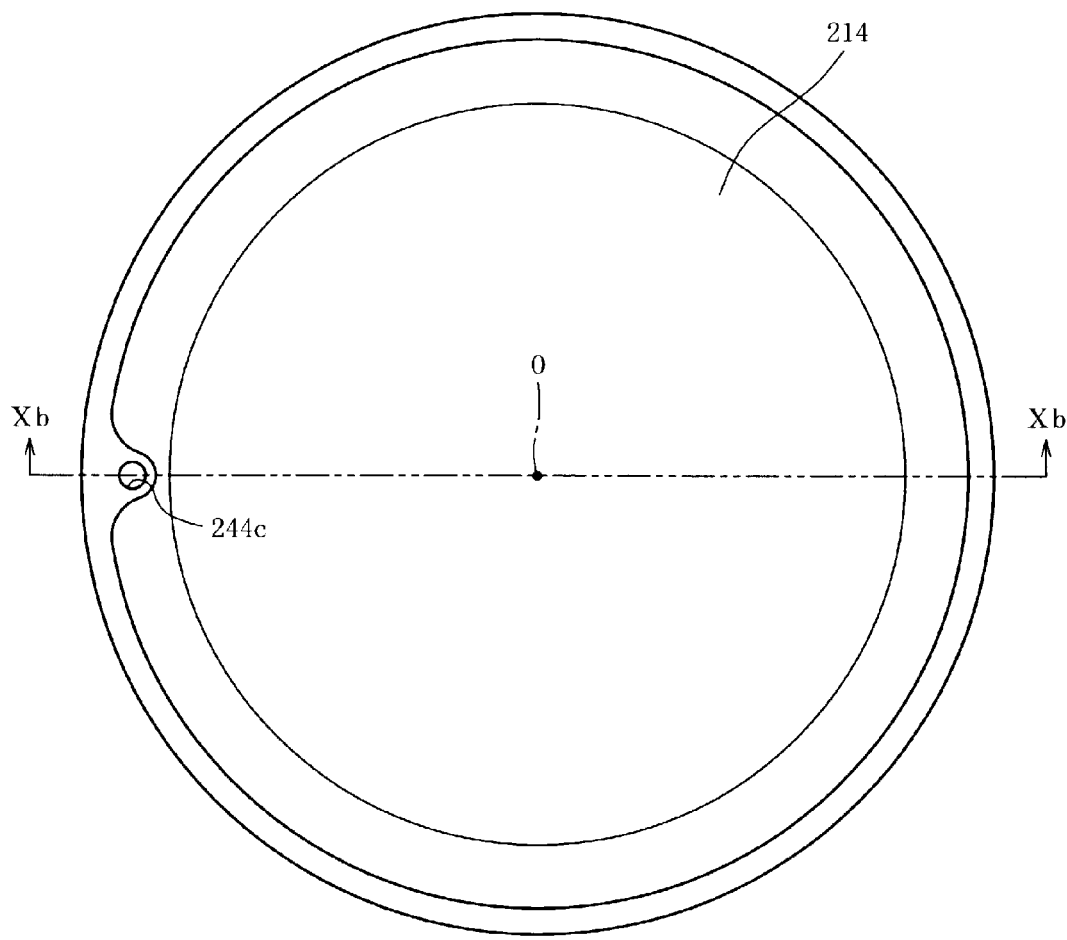
FIG. 10A is a top view of the diaphragm.
Figure 10B:
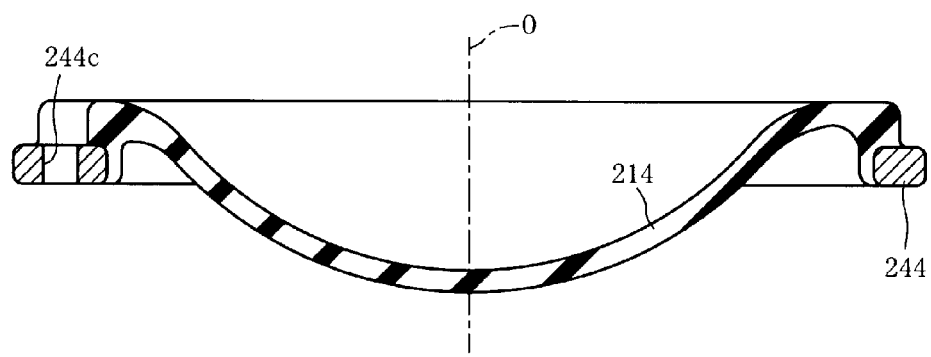
FIG. 10B is a cross-sectional view of the diaphragm taken from the line Xb-Xb in FIG. 10A.
Figure 11A:
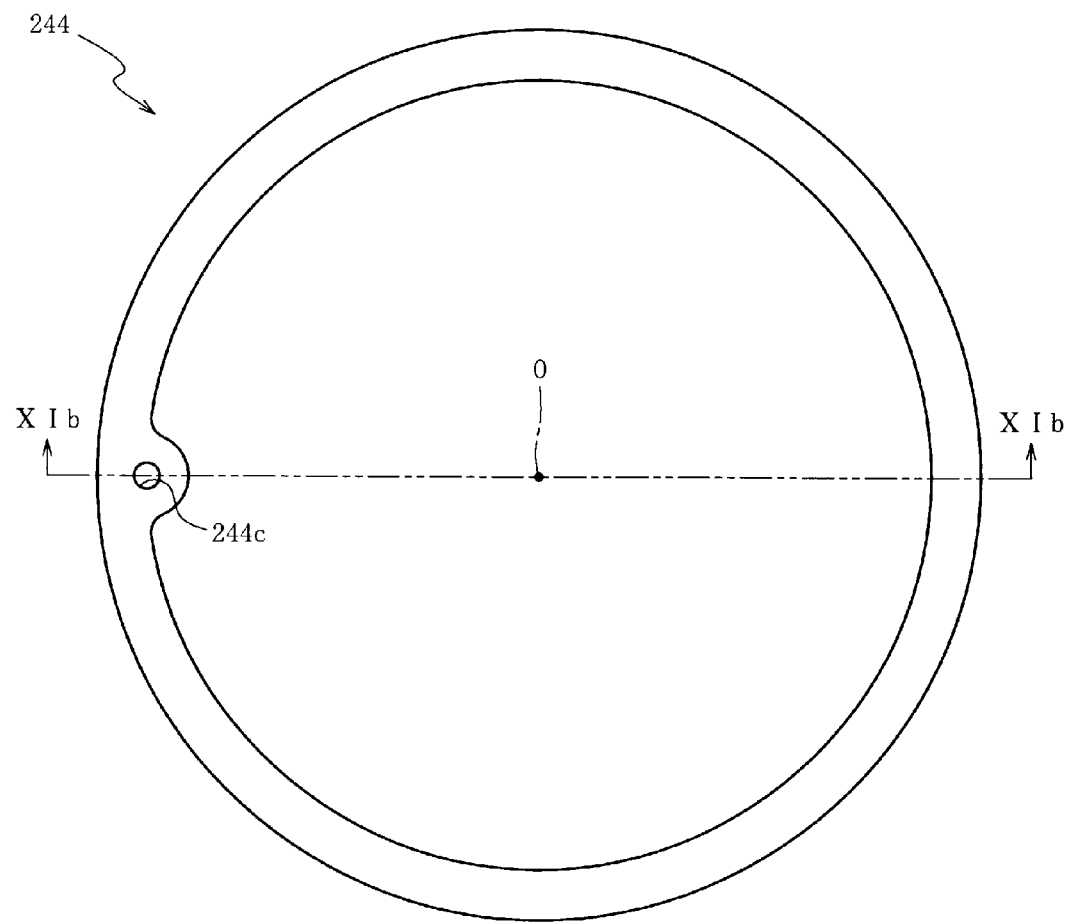
FIG. 11A is a top view of the annular attaching member.
Figure 11B:
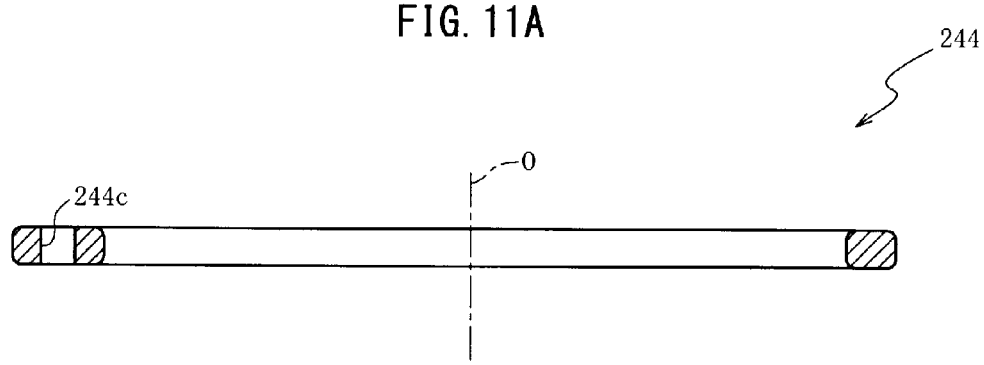
FIG. 11B is a cross-sectional view of the annular attaching member taken from the line XIb-XIb in FIG. 11A.

Next, the diaphragm 214 and the annular attaching member 244 will be described referring to FIG. 10A, FIG. 10B, FIG. 11A and FIG. 11B. FIG. 10A is a top view of the diaphragm 214, and FIG. 10B is a cross-sectional view of the diaphragm 214 taken from the line Xb-Xb in FIG. 10A. Also, FIG. 11A is a top view of the annular attaching member 244, and FIG. 11B is a cross-sectional view of the annular attaching member 244 taken from the line XIb-XIb in FIG. 11A.

As shown in FIG. 10A, FIG. 10B, FIG. 11A and FIG. 11B, the diaphragm 214 is formed into a membrane shape having a partial sphere shape inflated to the partition member 15 side and symmetric around the axis O, and is vulcanizingly adhered to the upper surface and the inner peripheral surface of the annular attaching member 244. The annular attaching member 244 is formed of an iron and steel material into a flat plate shape of an annular shape in a top view (when viewed in the axis O direction), and a projection of a semicircle shape in a top view is arranged so as to project inward in the radial direction. A decompressing-cum-pouring hole 244c is formed in the projection.

The outside diameter of the diaphragm 214 is made smaller than the outside diameter of the annular attaching member 244. Thereby, at the outer edge of the upper surface of the annular attaching member 244, an area exposed in an annular shape in a top view (that is, an area for allowing the upper end of the outer tube member 212 that has been deformed so as to reduce the diameter (deformed so as to be folded back) to engage thereto in fixing by caulking) is formed.

Also, the outside diameter of the annular attaching member 244 is made generally equal to the outside diameter of the partition member 15. That is, in a state that the annular attaching member 244 is fitted in to the inside of the outer tube member 212, the outer peripheral surface of the annular attaching member 244 is tightly attached to a rubber membrane that covers the inner wall surface of the small-diameter tube part 12b of the outer tube member 212.

The formation position of the decompressing-cum-pouring hole 244c is arranged on the inner side in the radial direction (on the axis O side) of the outer edge of the diaphragm 214. Accordingly, even after the upper end of the outer tube member 212 has been fixed by caulking, it is possible to furnish a pipe to the decompressing-cum-pouring hole 244c and to decompress the inside of the liquid-sealed chamber 16 and fill it with the liquid.

Also, in the diaphragm 214, an area corresponding to the decompressing-cum-pouring hole 244c is partially recessedly cut off in a semicircular shape in a top view. That is, around an opening of the decompressing-cum-pouring hole 244c, the diaphragm 214 is not disposed, and the upper surface of a flat plane shape of the annular attaching member 244 is exposed. Accordingly, similarly to the case of the first embodiment, the upper surface of the annular attaching member 244 can be utilized as a seat surface, and sealing performance in furnishing the pipe can be improved.

Figure 12:
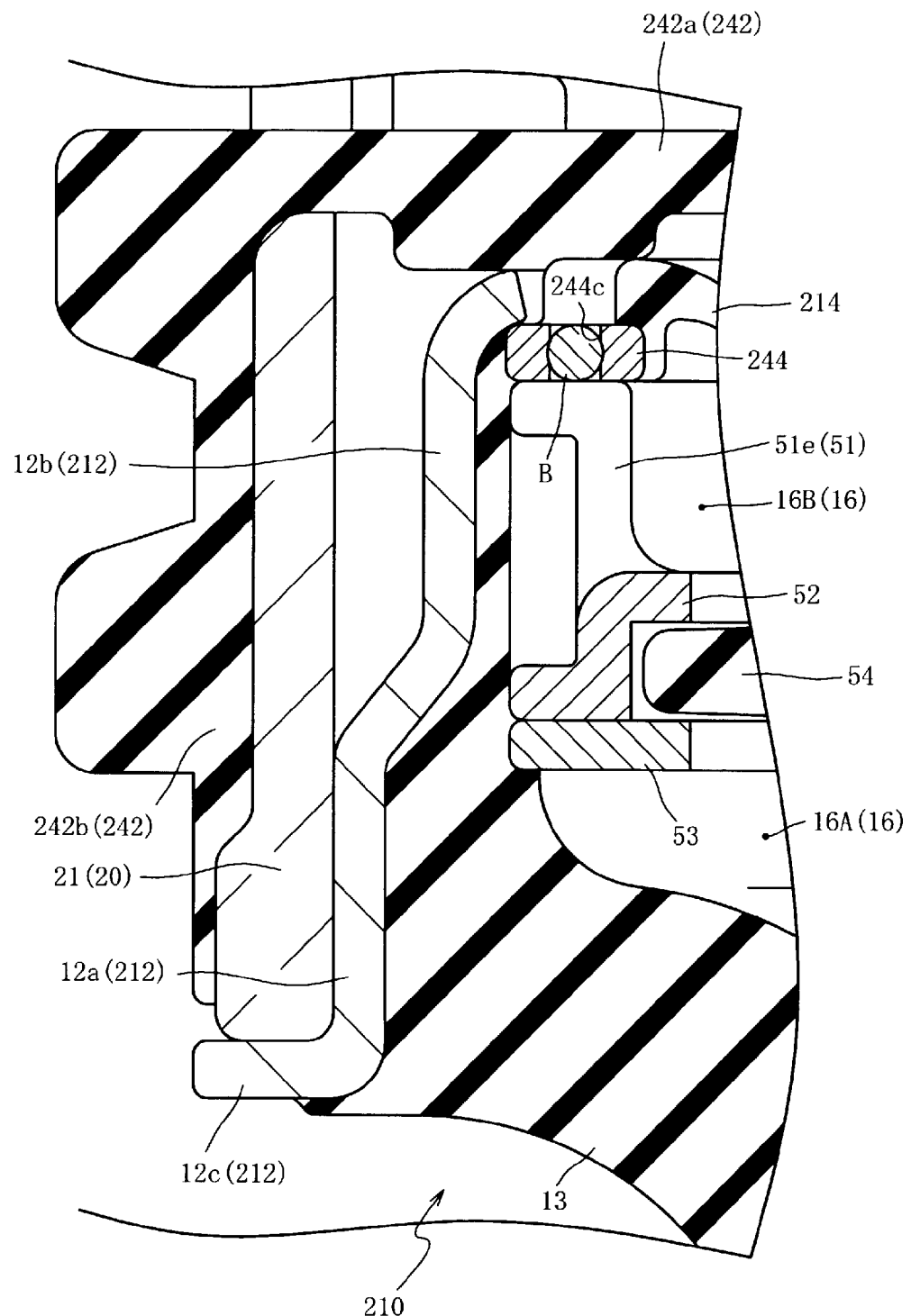
FIG. 12 is a partially enlarged cross-sectional view of the first unit.

Next, a method for manufacturing the vibration isolation unit 201 will be described referring to FIG. 12. FIG. 12 is a partially enlarged cross-sectional view of the first unit. In manufacturing the vibration isolation unit 201, first, similarly to the case of the first embodiment, the first molded body is vulcanizingly molded, and the partition member 15 is assembled. On the other hand, according to the second embodiment, the diaphragm 214 and the stopper rubber member 242 are vulcanizingly molded as components separate from each other.

Then, after the partition member 15 is fitted in into the outer tube member 212 of the first molded body, the annular attaching member 244 is fitted in, and the diaphragm 214 is attached to the upper end side of the outer tube member 212 (the small-diameter tube part 12b). In this case, the relative position in the peripheral direction of the annular attaching member 244 with respect to the partition member 15 is set to a predetermined position (that is, similarly to the case of the first embodiment, the position where the cutout 51e of the orifice forming part 51 overlaps with the decompressing-cum-pouring hole 244c when viewed in the axis O direction; refer to FIG. 12).

After the diaphragm 214 has been attached to the upper end side of the outer tube member 212, the upper end side of the small-diameter tube part 12b of the outer tube member 212 is subjected to diameter reducing work (caulking work), and the annular attaching member 244 is fixed by caulking using portion where the diameter of the small-diameter tube part 12b has been reduced.

Thus, because the liquid-sealed chamber 16 is formed between the vibration isolation base body 13 and the diaphragm 214, the inside of the liquid-sealed chamber 16 is decompressed until a predetermined negative pressure state is reached by vacuum suction through the decompressing-cum-pouring hole 244c, thereafter the liquid is poured in through the decompressing-cum-pouring hole 244c utilizing the negative pressure, and thereby the liquid-sealed chamber 16 is filled with the liquid.

In this case, similarly to the case of the first embodiment, in the step of vacuum suction of the inside of the liquid-sealed chamber 16 and the step of filling it with the liquid, suction of the air inside the first liquid chamber 16A and filling the inside of the first liquid chamber 16A with the liquid can be efficiently performed through the orifice 17 because the decompressing-cum-pouring hole 244c is arranged at a position overlapping with (a position opposing) the cutout 51e of the partition member 15 when viewed in the axis O direction.

After completion of filling the liquid-sealed chamber 16 with the liquid, the decompressing-cum-pouring hole 244c is sealed by the hard ball B (sealer) made of an iron and steel material, a resin material and the like as shown in FIG. 12. The vibration isolation device 210 (the large-diameter tube part 12a of the outer tube member 212) is pressed-in to the pressed-in part 21 of the engine side bracket 20, and the stopper rubber member 242 is furnished to a predetermined position of the vibration isolation device 210 and the pressed-in part 21 because the vibration isolation device 210 is thereby formed. As a result, a first unit shown in FIG. 12 (that is, the vibration isolation device 210 held by the engine side bracket 20 and furnished with the stopper rubber member 242) is formed.

After the first unit has been formed, similarly to the case of the first embodiment, the vibration isolation device 210 is arranged between the opposing surfaces of the bottom surface 31 and the upper surface 33 of the vehicle body side bracket 30, and the boss member 11 of the vibration isolation device 210 and the bottom surface 31 of the vehicle body side bracket 30 are fastened and fixed to each other by the bolt. Thus, manufacturing of the vibration isolation unit 201 is completed (refer to FIG. 9).

The present invention has been described above based on the embodiments; however, it can be easily presumed that the present invention is not limited to the embodiments described above by any means, and a variety of improvements and alterations are possible within the scope not departing from the objects of the present invention.

The numerical values cited in the respective embodiments are just examples, and it is a matter of course that other numerical values can be adopted.

In the first embodiment, a case is described in which the tubular part 44b of the annular attaching member 44 is internally fitted to the small-diameter tube part 12b of the outer tube member 12, ultrasonic welding is performed from the outer peripheral side of the small-diameter tube part 12b of the outer tube member 12 and thereby both are welded to each other; however the present invention is not limited to it, and it may be configured such that the tubular part 44b of the annular attaching member 44 is externally fitted to the small-diameter tube part 12b of the outer tube member 12, ultrasonic welding is performed from the outer peripheral side of the tubular part 44b of the annular attaching member 44 and thereby both are welded to each other. In this case, the decompressing-cum-pouring hole 44c is arranged only in the annular part 44a.

In the respective embodiments, a case is described in which the hard ball B is used as an example of a sealer that seals the decompressing-cum-pouring hole 44c, 244c; however the present invention is not limited to it, and it is a matter of course that other sealers can be adopted. As the other sealers, a rivet can be exemplarily cited. Also, the material of the hard ball B is not limited. For example, the hard ball B may be formed of a resin material.

In the respective embodiments, a case is described in which the cutout 51e is positioned right below the decompressing-cum-pouring hole 44c, 244c of the annular attaching member 44, 244 (overlapped with the decompressing-cum-pouring hole 44c, 244c when viewed in the axis O direction). In this case, the positional relation of the cutout 51e and the decompressing-cum-pouring hole 44c, 244c in the respective embodiments shows one example, and the imaginary line P passing the axis of the decompressing-cum-pouring hole 44c, 244c and extending in the penetrating direction only has to be positioned at least on the area where the cutout 51e is formed when viewed in the axis O direction.

What is claimed is:

1. A vibration isolation unit comprising:
    a liquid-sealed vibration isolation device including a cylindrical outer tube member, a boss member positioned on the lower end side of the outer tube member, a vibration isolation base body connecting the boss member and the outer tube member to each other and formed of a rubber-like elastic body, a diaphragm attached on the upper end side of the outer tube member, forming a liquid-sealed chamber between the vibration isolation base body and the diaphragm and formed of a rubber-like elastic body, a partition member partitioning the liquid-sealed chamber into a first liquid chamber on the vibration isolation base body side and a second liquid chamber on the diaphragm side, and an orifice allowing the first liquid chamber and the second liquid chamber to communicate with each other;
    an engine side bracket including a pressed-in part to which the outer tube member of the liquid-sealed vibration isolation device is pressed-in and which is connected to the engine side;
    a vehicle body side bracket including a bottom surface to which the boss member of the liquid-sealed vibration isolation device is fixed, a pair of side walls erected from the bottom surface and opposing to each other embracing the liquid-sealed vibration isolation device, and an upper surface connecting the pair of side walls to each other and opposing the bottom surface embracing the liquid-sealed vibration isolation device, and connected to a vehicle body side; and
    a stopper rubber member interposed between the side wall of the vehicle body side bracket and the pressed-in part of the engine side bracket and formed of a rubber-like elastic body;
    wherein the stopper rubber member includes stopper rubber upper surfaces of which one side continues to an outer edge of the diaphragm and which are disposed on the upper end side of the pressed-in part of the engine side bracket, and stopper rubber side walls hung down from the other side of the stopper rubber upper surfaces and disposed between the side walls of the vehicle body side bracket and the pressed-in part of the engine side bracket; and further comprising:
    an annular attaching member to which the diaphragm is vulcanizingly adhered and which is formed of a resin material into an annular shape when viewed in the axial direction;
    wherein the outer tube member is formed of a resin material into a cylindrical shape, and
    the diaphragm is attached to the upper end side of the outer tube member by that the annular attaching member is welded to the outer tube member by welding.

2. The vibration isolation unit according to claim 1, wherein the annular attaching member is ultrasonically welded to the outer tube member.

3. The vibration isolation unit according to claim 2, wherein the annular attaching member includes an annular part to which the diaphragm is vulcanizingly adhered and a tubular part connected to the lower surface side of the annular part, formed into a cylindrical shape, and internally fitted to the inner peripheral side or externally fitted to the outer peripheral side of the outer tube member, and
    the outer tube member and the tubular part of the annular attaching member are welded to each other by subjecting the outer peripheral side of the outer tube member to which the tubular part of the annular attaching member is internally fitted on the inner peripheral side or the outer peripheral side of the tubular part of the annular attaching member externally fitted to the outer peripheral side of the outer tube member to ultrasonic welding.

4. The vibration isolation unit according to claim 3, wherein the outer tube member includes a large-diameter tube part positioned on the lower end side and a small-diameter tube part formed to have a diameter smaller than that of the large-diameter tube part and positioned on the upper side, with the large-diameter tube part pressed-in to the pressed-in part of the engine side bracket, and
    the tubular part of the annular attaching member is internally fitted to the inner peripheral side of the small-diameter tube part of the outer tube member.

5. The vibration isolation unit according to claim 4, wherein, in the annular attaching member, an outer edge portion of the annular part is formed so as to extend outward in the radial direction from the tubular part, and the lower surface of the outer edge portion of the annular part formed so as to extend outward in the radial direction from the tubular part is made to abut on an upper end surface of the small-diameter tube part of the outer tube member.

6. The vibration isolation unit according to claim 1, wherein the liquid-sealed vibration isolation device includes a decompressing-cum-pouring hole allowing the liquid-sealed chamber to communicate with the outside and a sealer sealing the decompressing-cum-pouring hole, and is manufactured by filling the liquid-sealed chamber with liquid by pouring the liquid through the decompressing-cum-pouring hole after decompressing inside of the liquid-sealed chamber through the decompressing-cum-pouring hole, and sealing the decompressing-cum-pouring hole by the sealer, and the decompressing-cum-pouring hole is disposed in the annular attaching member.

* * * * *